US011838309B1

(12) United States Patent
Martin et al.

(10) Patent No.: US 11,838,309 B1
(45) Date of Patent: Dec. 5, 2023

(54) SYSTEM AND METHOD FOR RISK EVALUATION AND REPUTATIONAL SCORING OF SOCIAL MEDIA ACCOUNTS

(71) Applicants: Roger Martin, Del Mar, CA (US); Doug Hecht, San Diego, CA (US)

(72) Inventors: Roger Martin, Del Mar, CA (US); Doug Hecht, San Diego, CA (US)

( * ) Notice: Subject to any disclaimer, the term of this patent is extended or adjusted under 35 U.S.C. 154(b) by 340 days.

(21) Appl. No.: 17/404,963

(22) Filed: Aug. 17, 2021

Related U.S. Application Data

(60) Provisional application No. 63/067,784, filed on Aug. 19, 2020.

(51) Int. Cl.
*H04L 9/40* (2022.01)
*G06Q 50/00* (2012.01)

(52) U.S. Cl.
CPC ...... *H04L 63/1433* (2013.01); *H04L 63/1425* (2013.01); *G06Q 50/01* (2013.01)

(58) Field of Classification Search
CPC . H04L 63/1433; H04L 63/1425; G06Q 50/01; G06Q 20/384; G06Q 50/265; G06Q 30/06; H04W 12/67; H04W 12/68
See application file for complete search history.

(56) References Cited

U.S. PATENT DOCUMENTS

| | | | | |
|---|---|---|---|---|
| 8,782,217 B1* | 7/2014 | Arone | ................... | G06F 21/554 709/224 |
| 11,019,090 B1* | 5/2021 | Smith | ................... | G06F 21/40 |
| 2015/0178920 A1* | 6/2015 | Garnavi | ................... | G16H 50/30 600/476 |
| 2018/0324126 A1* | 11/2018 | Grant | ................... | H04L 51/224 |
| 2019/0141057 A1* | 5/2019 | Burgis | ................... | G06F 21/554 |
| 2019/0394231 A1* | 12/2019 | Smith | ................... | H04L 63/1416 |
| 2020/0065513 A1* | 2/2020 | Sridharan | ................ | G06N 3/08 |
| 2020/0242161 A1* | 7/2020 | Dugan | ................... | G06N 20/00 |

(Continued)

OTHER PUBLICATIONS

Hernandez-Alvarez,"Detection of Possible Human Trafficking in Twitter," 2019 International Conference on Information Systems and Software Technologies (ICI2ST) Year: 2019 | Conference Paper | Publisher: IEEE.*

(Continued)

*Primary Examiner* — Roderick Tolentino
(74) *Attorney, Agent, or Firm* — Cooley LLP

(57) ABSTRACT

A method of evaluating risk associated with a social media account. Content associated with the account and with social media accounts connected to the account is scanned. Collected data relating to the account content and the connected account content is stored. The account content is analyzed by determining one or more of characteristics of a posted image, parameters of posted comments, and changes in the list of connected social media accounts. The collected data is also analyzed in order to characterize the connected social media accounts with levels of suspicion. A report may be generated that includes one or more of: information identifying at least some of the account content as presenting a risk based upon characteristics of posted images or comments, information identifying material changes in account user traffic, and information identifying one or more of the connected social media accounts as being associated with suspicious activity.

23 Claims, 22 Drawing Sheets

(56) References Cited

U.S. PATENT DOCUMENTS

2021/0166331 A1\* 6/2021 Buglak .................. G06Q 40/03
2021/0224536 A1\* 7/2021 Correa ................. G06V 20/176

OTHER PUBLICATIONS

Chung et al., "Criminal intelligence surveillance and monitoring on social media: Cases of cyber-trafficking," 2017 IEEE International Conference on Intelligence and Security Informatics (ISI) Year: 2017 | Conference Paper | Publisher: IEEE.\*

\* cited by examiner

FIG. 10B

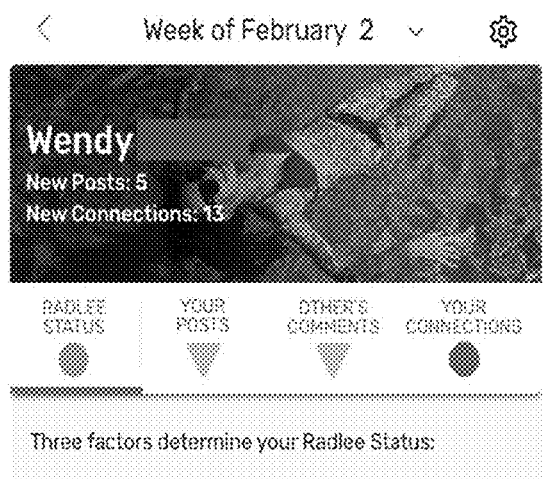
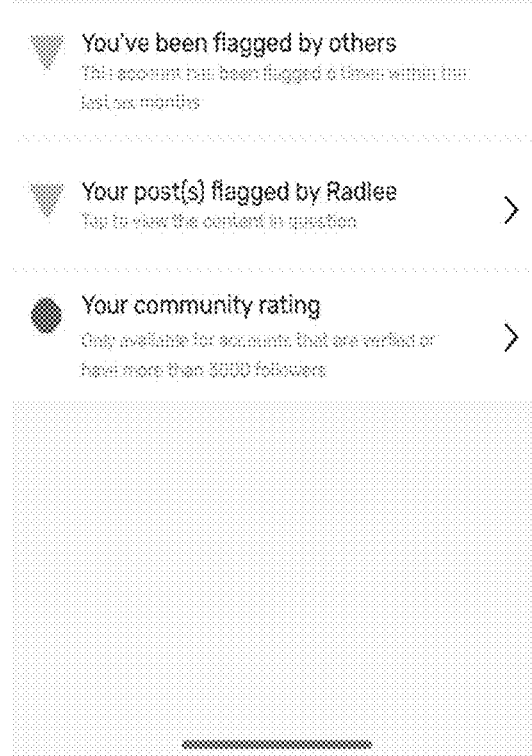
FIG. 12A
FIG. 12B

SYSTEM AND METHOD FOR RISK EVALUATION AND REPUTATIONAL SCORING OF SOCIAL MEDIA ACCOUNTS

CROSS-REFERENCE TO RELATED APPLICATIONS

The present application claims the benefit of priority under 35 U.S.C. § 119(e) of U.S. Provisional Application No. 63/067,784, entitled SYSTEM AND METHOD FOR RISK EVALUATION AND REPUTATIONAL SCORING OF SOCIAL MEDIA ACCOUNTS, filed Aug. 19, 2020, the content of which is hereby incorporated by reference in its entirety for all purposes.

FIELD

The present disclosure relates generally to methods for monitoring and evaluating user activity and content associated with Internet-based social media platforms. More particularly, but not exclusively, the present disclosure relates to systems and methods for monitoring and assessing risks associated with user accounts hosted by such social media platforms.

BACKGROUND

Social media platforms and services continue to draw an ever increasing number of users and facilitate ever higher levels of online social interaction. Given the ubiquity of social media, it is not surprising that it has increasingly been targeted for exploitation by malicious third parties. Although many legitimate businesses create accounts on social media websites in order to promote their products and services or otherwise connect with their customers, other third parties may create "fake" or fraudulent accounts on social media websites and use them for nefarious purposes.

These nefarious activities can be criminal in nature and have grave consequences. For example, recent studies and news reports have shown that sexual predators use social media and other online technology platforms to target and harm children. Human trafficking is currently a US $150 billion industry and may be the world's fastest growing criminal enterprise. Of the 40 million victims worldwide, 10 million are children. One million children are victims of sexual exploitation and one sixth of endangered runaways were likely sex trafficking victims. In the U.S. alone, it is estimated that between 100,000 and 300,000 children are vulnerable to being trafficked.

Most exploited kids first met their trafficker online. Traffickers prey on large numbers of vulnerable kids on social media by exploiting their desire for connection, success and "likes". The reach and ease of connection of social media allows traffickers to continuously search for and recruit multiple different victims at once online. Traffickers and their victims utilize common social media apps, none of which currently employ effective techniques to detect or prevent the predatory use of accounts on their platforms.

SUMMARY

Disclosed herein is a system and method for risk evaluation and reputational scoring of social media accounts. The system may be implemented as, for example, an Internet-based service enabling parents to monitor and be informed of risks associated with their child's social media account. The system may utilize artificial intelligence to analyze public photos, comments, hashtags, likes, and other public-facing aspects of a child's social media account in order to detect risky and suspicious activity. The system is configured to identify, on the basis of expert research relating to the behavior of online predators and their potential victims, common predatory tactics and the types of posts that attract the attention of an online predator. Results of the analysis are then summarized and alerts based upon known predatory risk provided so parents or guardians can easily identify the concerning posts and accounts.

In one implementation the system may leverage image recognition and a database of known predatory behavior. The system may be configured to automatically scan every post within the monitored social media account to identify elements that are known to attract predators. This enables parental alerts to be generated based upon the content of elements like hashtags, captions, and photos. Additionally, the system helps parents to identify posts that are attracting more attention than normal, alerting them to spikes in "like" and comment volume.

The system may be configured to provide alerts when comments by others meet high-risk criteria, highlighting the words that are of most concern. Moreover, the system permits a parental user to learn more about the typical activity of persons making questionable contact with a child via the monitored social media account.

In one aspect the system may be implemented by at least one server in network communication with user devices executing reputational scoring application programs, or "apps". The server includes one or more processors operatively connected to a memory. The one or more processors are configured to scan account content associated with a social media account, the account content including at least one image posted to the social media account by a user of the social media account and at least one comment or image caption posted to the social media account by the user. The account content may further include a list of connected social media accounts having a connection to the social media account. The list of connected social media accounts may include at least one of a list of social media accounts following the social media account and a list of social media accounts followed by the user of the social media account. The one or more processors may be further configured to scan connected account content associated with at least some of the connected social media accounts, the connected account content including at least one of profile metadata and content metadata. Collected data relating to the account content and the connected account content may be stored, within the memory, by the one or more processors. The collected data relating to the account content may be analyzed by the one or more processors by determining at least one of: one of more characteristics of the image, one or more parameters of the at least one comment or image caption, and changes in the list of connected social media accounts. The one or more processors may be further configured to analyze the collected data relating to the connected account content and to characterize one or more of the connected social media accounts with a level of suspicion. A risk assessment report identifying risk information relating to risk-related characteristics of the social media account may be generated by the one or more processors, the risk information including one or more of: (i) content characterization information identifying at least some of the account content as presenting a risk based upon at least one of: the one of more characteristics of the image and the one or more parameters of the at least one comment or image caption, (ii) traffic change information identifying changes in user traffic associated with the social media account greater than a defined threshold within a defined time period, and (iii) suspicious account information identifying one or more of the connected social media accounts as being associated with suspicious activity.

The disclosure also relates to a system including a memory and one or more processors operatively connected to the memory. The one or more processors are configured to scan account content associated with a social media account wherein the account content includes at least one image and image caption posted to the social media account and one or more comments posted to the social media account by one or more commenting users associated with one or more commenting social media accounts. The one or more processors are further configured to scan commenting account content associated with at least some of the one or more commenting social media accounts, the commenting account content including at least one of profile metadata and content metadata. Collected data relating to the account content and the commenting account content is stored, by the one or more processors, within the memory. The collected data relating to the account content is analyzed by the one or more processors by determining at least one of: one of more characteristics of the image, and at least one parameter of the one or more comments or of the at least one image caption. The collected data relating to the commenting social media account content is analyzed by the one or more processors and one or more of the commenting social media accounts are characterized with a level of suspicion. The one or more processors are further configured to generate a risk assessment report identifying risk information relating to risk-related characteristics of the social media account. The risk information may include one or more of (i) content characterization information identifying at least some of the account content as presenting a risk based upon at least one of: the one of more characteristics of the image and the at least one parameter of the one or more comments or of the at least one image caption, (ii) traffic change information identifying changes in user traffic associated with the social media account greater than a defined threshold within a defined time period, and (iii) suspicious account information identifying one or more of the commenting social media accounts as being associated with suspicious activity.

The disclosure also pertains to a system including a memory and one or more processors operatively connected to the memory. The one or more processors are configured to scan account content associated with a social media account, the account content including a plurality of posts, the plurality of posts including at least one image posted to the social media account by a user of the social media account and at least one comment or image caption posted to the social media account by the user. The account content further includes a list of connected social media accounts having a connection to the social media account. The list of connected social media accounts includes at least one of a list of social media accounts following the social media account and a list of social media accounts followed by the user of the social media account. The one or more processors are further configured to store, within the memory, collected data relating to the account content and to analyze the collected data relating to the account content by determining at least one of: one or more characteristics of the image, one or more parameters of the at least one comment or image caption, and changes in the list of connected social media accounts. The one or more processors are further configured to generate a risk assessment report including risk information, the risk information including one or more of: post characterization information identifying at least one of the plurality of posts as including textual or image content of defined types, traffic change information identifying changes in user traffic associated with the social media account greater than a first defined threshold within a first defined time period, and new connected account information identifying increases in a number of the connected social media accounts exceeding a second defined threshold within a second defined time period.

In another aspect the disclosure relates to a system including a memory and one or more processors operatively connected to the memory. The one or more processors are configured to scan account content associated with a social media account, the account content including at least one image posted to the social media account by a user of the social media account and at least one comment or image caption posted to the social media account by the user. The account content further includes a list of connected social media accounts having a connection to the social media account, the list of connected social media accounts including at least one of a list of social media accounts following the social media account and a list of social media accounts followed by the user of the social media account. The one or more processors are further configured to determine a first number of the connected social media accounts existing at a first time and a second number of the connected social media accounts existing at a second time. Collected data relating to the account content and the first number and the second number of connected social media accounts is stored, within the memory, by the one or more processors. The one or more processors are further configured to analyze the collected data relating to the account content by determining at least one of: one of more characteristics of the image and a difference between the second number of connected social media accounts and the first number of connected social media account. A risk assessment report identifying risk information relating to risk-related characteristics of the social media account is generated by the one or more processors, the risk information including content characterization information identifying at least some of the account content as presenting a risk based upon at least one of: the one of more characteristics of the image, and a value of the difference greater than a defined threshold.

The disclosure is also directed to a computer-implemented method of evaluating risk associated with a social media account. The method includes automatically scanning account content associated with a social media account wherein the account content includes at least one image posted to the social media account by a user of the social media account and at least one comment or image caption posted to the social media account by the user, the account content further including a list of connected social media accounts having a connection to the social media account. The list of connected social media accounts includes at least one of a list of social media accounts following the social media account and a list of social media accounts followed by the user of the social media account. The method includes automatically scanning connected account content associated with at least some of the connected social media accounts, the connected account content including at least one of profile metadata and content metadata. The method further includes storing, within a memory, collected data relating to the account content and the connected account content. The collected data relating to the account content is analyzed by determining at least one of: one of more characteristics of the image, one or more parameters of the at least one comment or image caption, and changes in the list of connected social media accounts. The method further includes analyzing the collected data relating to the connected account content and characterizing one or more of the connected social media accounts with a level of suspicion. The method also includes generating a risk assessment report identifying risk information relating to risk-related characteristics of the social media account, the risk information including one or more of: (i) content characterization information identifying at least some of the account content as presenting a risk based upon at least one of: the one of more characteristics of the image and the one or more parameters of the at least one comment or image caption, (ii) traffic change information identifying changes in user traffic associated with the social media account greater than a defined threshold within a defined time period, and (iii) suspicious account information identifying one or more of the connected social media accounts as being associated with suspicious activity.

BRIEF DESCRIPTION OF THE DRAWINGS

For a better understanding of the nature and objects of various embodiments of the invention, reference should be made to the following detailed description taken in conjunction with the accompanying drawings, wherein:

FIGS. 10B and 10C are screenshots of user interfaces generated by the system of FIG. 1 which illustrate crawler accounts and crawler processes, respectively.

FIG. 12A is a screenshot of a user interface produced by the risk evaluation and reputational scoring app which includes alerts generated for a post to a social media account being monitored.

FIG. 12B is a screenshot of a screenshot of a user interface produced by the risk evaluation and reputational scoring app which includes an exemplary weekly status report for a particular social media account.

Figure 1:
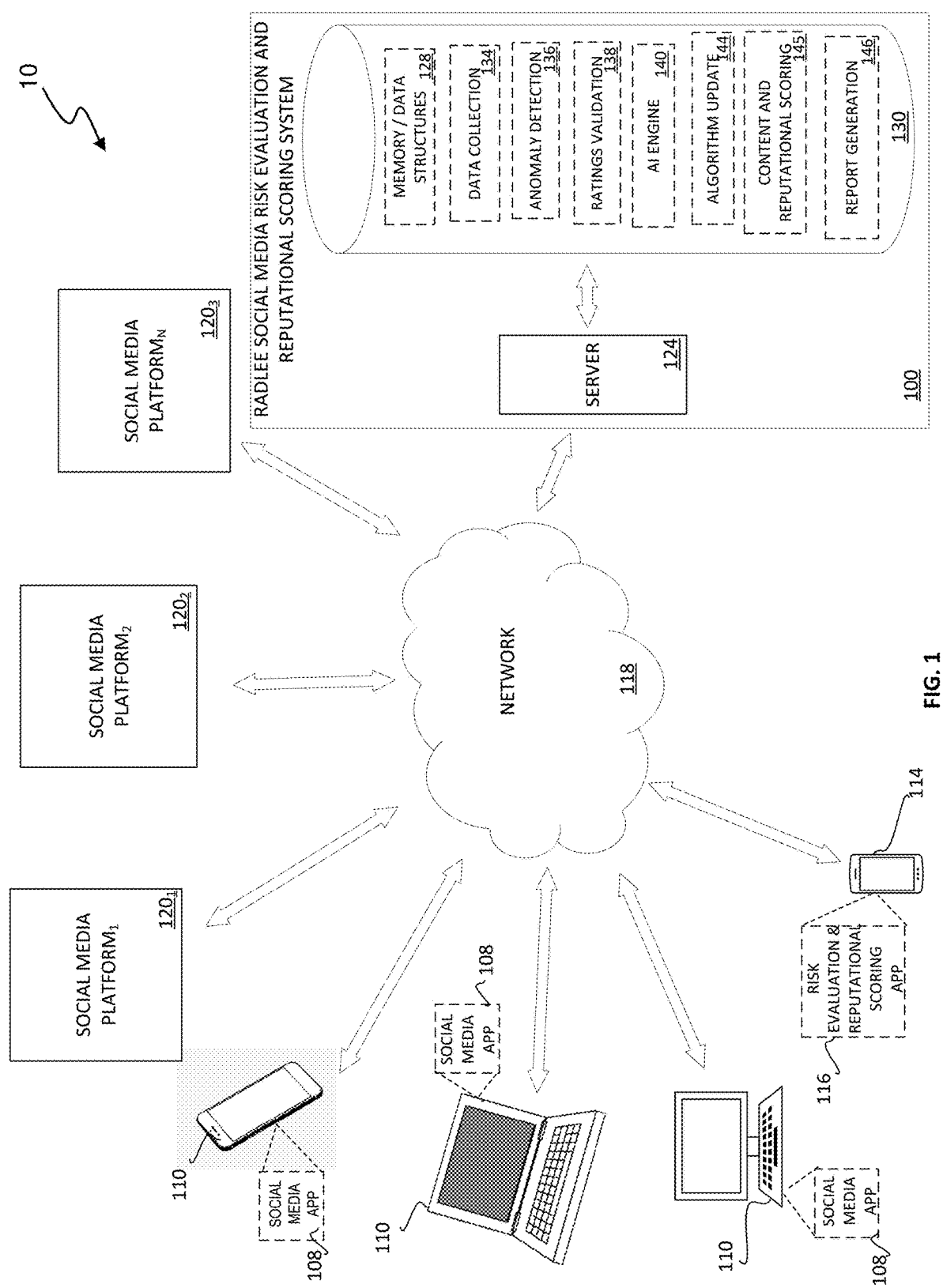
FIG. 1 illustrates a network environment which includes a system for reputational scoring of social media accounts in accordance with an embodiment.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF EMBODIMENTS

Various embodiments are described below with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

Disclosed herein is a system and method for risk evaluation and reputational scoring of social media accounts. In particular embodiments of the system, artificial intelligence and image recognition techniques are used to enable risk evaluation and reputational scoring of linked social media accounts, thereby enabling rapid identification of "at-risk" accounts associated with, for example, children and adolescents. By facilitating finding at-risk children and adolescents before human traffickers do and potentially notifying parents or guardians, the present system enables potential victims to be educated and inoculated against trafficker's recruitment tactics.

As is discussed below, the present system can, for example, identify specifics photos, comments and suspicious followers associated with a given social media account which potentially indicate higher risk. Moreover, embodiments of the present system are configured to do so in a way that is easy for parents and guardians to understand.

Attention is now directed to FIG. 1, which illustrates a network environment 10 which includes a system 100 for reputational scoring of social media accounts in accordance with an embodiment. The network environment 10 includes a plurality of social media platforms 120 capable of being accessed by respective social media apps 108 executed by user devices 110 such as, for example, smartphones, desktop computers, laptop computers, and tablet computers. As is described hereinafter, in exemplary embodiments the system 100 is configured to monitor, evaluate and score social media accounts associated with one or more of the social media platforms 120 (e.g., Instagram, Facebook, Snapchat).

The user electronic devices 110 are in communication over a network 118 with the system 100. As shown, the system 100 includes at least one server 124 and memory storage 130. The memory storage 130 may store a data collection module 134, an anomaly detection module 136, a ratings validation module 138, an AI engine 140, an algorithm update module 144, a content and reputational scoring module 145, and a report generation module 146. The system 100 may also communicate via the network 118 with the social media platforms 120 and with one or more electronic devices 114 configured with a reputational scoring app 116 hosted by the system 100. In one exemplary embodiment the reputational scoring app 116 is installed on the electronic devices 114 of the parents or guardians of children possessing user devices 110 running one or more social media apps 108. In this exemplary embodiment parents may monitor, through the app 116, social media activities engaged in by their children via the social media apps installed on the devices 110.

Figure 2:
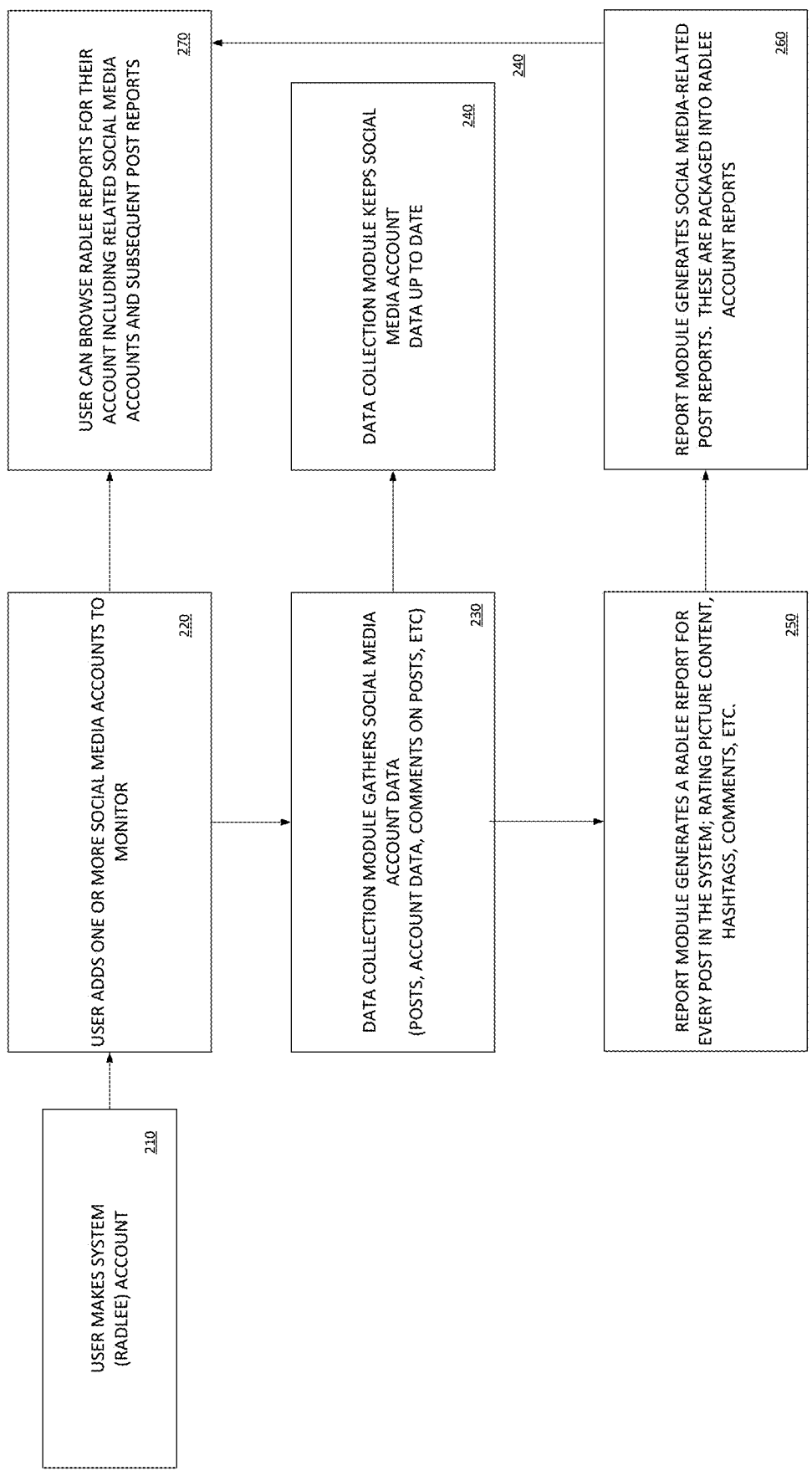
FIG. 2 illustrates a high-level flow of an exemplary social media account monitoring and evaluation process performed by the system of FIG. 1.

Attention is now directed to FIG. 2, which illustrates a high-level flow of an exemplary social media account monitoring and evaluation process 200 performed by the system 100. As an initial step, a parent or guardian creates a system account through the app 116 (stage 210). Once an account has been created through the app 116, one or more social media accounts (typically associated with a child or adolescent) to be monitored are associated with the system account created through the app 116 and login credentials for such accounts are received (stage 220). Next, data collection module 134 gathers account data (e.g., username and profile, photos, posts, account metadata, comments on posts, etc.) and stores it within a data structure within memory 128 (stage 230). The data collection 134 also monitors the social media accounts associated with the account created through the app 116 in order to keep the social media account data up to date (stage 240). This monitoring may be periodic or triggered by various events (e.g., posts) associated with the monitored social media accounts. In one embodiment a report generation module 146 generates a report for pre-defined aspects of the social media accounts being monitored (e.g., posts, rating, picture content, hashtags, hashtags, etc.) (stage 250). As is discussed further below, in one embodiment the AI engine 140 is trained to recognize potentially suspicious content or activity associated with the monitored social media accounts and is utilized in identifying such content or activity as part of the report generation process of stage 250. Based upon the reports for each aspect of a given account generated in stage 20, the report generation module 146 then synthesizes a report summarizing each social media account being monitored and may package these accounts together with prior report to provide perspective and a basis for comparison (stage 260).

Referring to the screenshots of FIGS. 9A to 9F (which are presented via a user interface of the app 116), these reports may include alerts 910 generated in response to, for example, the identification of certain types of content in a monitored social media account. For example, an alert may be triggered when the account owner posts a racy photo (e.g., a bikini photo or a photo with nudity), or when comments on the posted photo or other posted content appears to be inappropriate. As another example, an alert may be generated when traffic associated with a posted photo in a monitored account substantially exceeds an average associated with the account (e.g., is 125% higher). Similarly, an alert may be generated when certain types of hashtags (e.g., #teenmodel) are posted in association with a photo added to monitored social media account. See, for example, FIG. 12A, which is a screenshot of a user interface produced by the risk evaluation and reputational scoring app 116 containing alerts 1210 generated for a post 1220 to a social media account being monitored. FIG. 12B is a screenshot of a user interface produced by the risk evaluation and reputational scoring app 116 which includes an exemplary weekly status report for the social media account being monitored.

In one embodiment the AI engine 140 is trained to able to discriminate between, for example, extremely provocative photos likely to result in negative attention (e.g., bikini photos with substantial nudity) and less racy photos (e.g., other bikini or swimwear photos less likely to garner negative attention), and to appropriately adjust scoring performed by the scoring module 145.

Again referring to FIGS. 9A-9F, the reports created by the report generation module 146 may illustrate post volume or other account activity over time (e.g., on a week-to-week basis). Large changes or spikes in such activity may suggest to a parent that account activity during the relevant period should be investigated.

Figure 7:
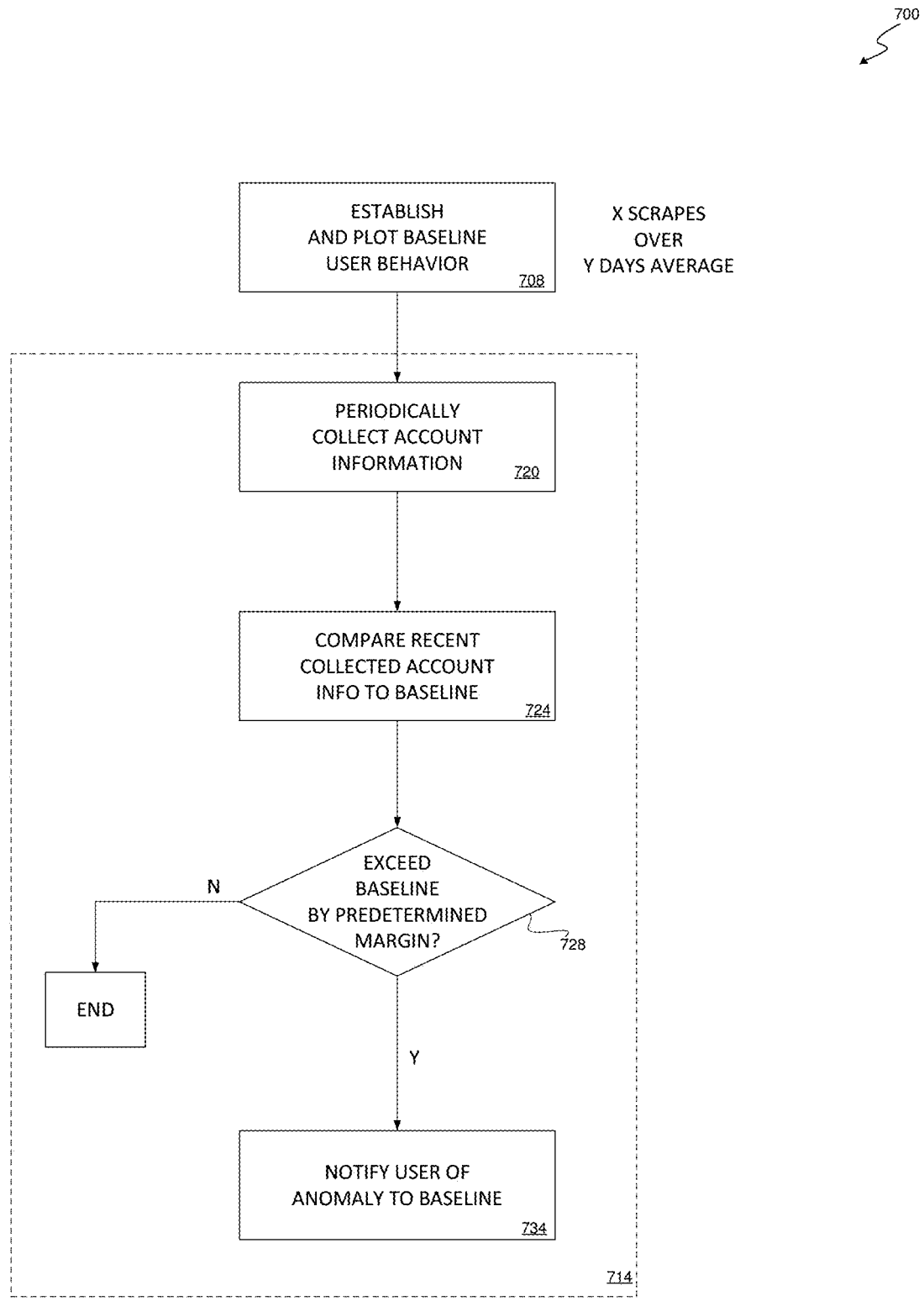
FIG. 7 illustrates that an anomaly detection module may be configured to identify heightened account activity levels relative to baseline or historical average values.

I Turning now to FIG. 7, a flowchart illustrating an exemplary sequence of operations 700 performed by the anomaly detection module 136 is illustrated. These operations include establishing a baseline of user behavior and then periodically collecting account information. Recently collected account information is then compared to the established baseline. When some aspect (e.g., information volume) of the more recent information exceeds the baseline by a predetermined margin, a user of the app 116 is informed of an anomaly relative to baseline exists in the monitored social media account.

In one embodiment the anomaly detection module 136 may be configured to facilitate the process of identifying anomalous behavior in social media accounts suggesting a potential need for investigation. As is shown in greater detail in FIG. 7, the anomaly detection module 136 may, for example, be configured to identify heightened account activity levels relative to baseline or historical average values. Consider the case in which a posted photo received 120 views and 28 likes and the historical averages associated with the monitored social media account were 20 views and 2 likes per posted photo. In this example the anomaly detection module 136 may be configured to establish and plot a baseline (stage 708), and then identify anomalies relative to that baseline (stage 714). In such cases the anomaly detection module 136 may be further configured to determine what extent any increase in attention to a photo posted in a monitored social media account may be attributed to new followers of the account and, further, whether such new followers are likely associated with "made up" or otherwise fake accounts potentially owned or associated with a predator.

In order to evaluate whether new "follower" accounts are associated with a predator or other third party with potentially malicious intent, the anomaly detection module 136 may determine whether, for example, such accounts are associated with suspicious content. For example, the content of their profile, their absolute and relative numbers of followers and accounts followed, number of newly followed accounts, types of accounts followed, and the like, all may provide relevant information concerning whether an account following a monitored social media account is indeed genuine (e.g., not malicious) or is simply a "fake" account created for malicious purposes.

As shown in FIG. 7, the an exemplary process for identifying anomalies relative to established baseline(s) (stage 714) may include the operations of periodically collecting social media account information (stage 720) and comparing recently collected social media account information relative to the established baseline(s) (stage 724). To the extent attributes or parameters of the recently collected account information (e.g., likes, user traffic, number of connected accounts, number of comments, etc.) exceed the established baseline(s) for such attributes or parameters by a predetermined margin (stage 728), a user notification of the existence of an anomaly in such an attribute or parameter relative to the relevant established baseline is generated (stage 734).

Referring again to FIG. 2, parents or other authorized users of the app 116 may browse through the reports created by the report generation module 146 (stage 270).

Figure 3:
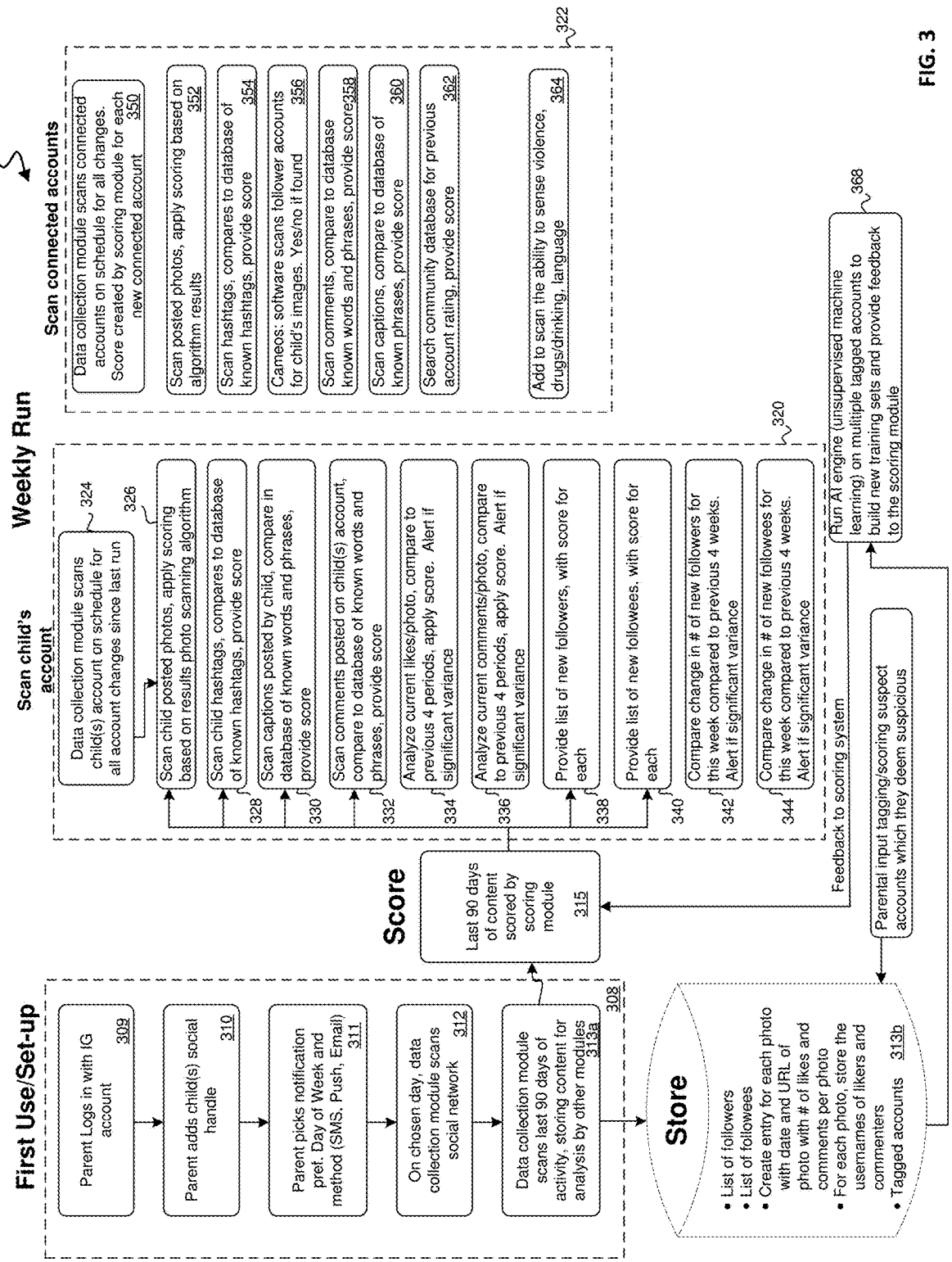
FIG. 3 is a more detailed flowchart of various front end and backend processes performed by the system of FIG. 1 in connection with monitoring and evaluation of social media accounts.

Turning now to FIG. 3, a more detailed flowchart is provided of various front end and backend processes 300 performed by the system 100 in connection with monitoring and evaluation of social media accounts. As shown, during first use or set up of an account through the app 116 (stage 308), a parent accesses the account being set up on the system 100 (stage 309) and provides log in credentials and/or a social handle for a child's social media account to be monitored by the system 100 (stage 310). The parent then specifies a preferred day of the week to receive reports and scores associated with the child's monitored social media account and further specifies a preferred mode of notification (e.g., SMS, Push, Email, etc.) (stage 311). On the day of the week specified by the parent, the system 100 scans the child's social media account and connected social media accounts in the manner described hereinafter and illustrated by FIG. 3 (stage 312). In one embodiment at least 90 days of activity of the monitored social media account is scanned by the data collection module 134 and selected details of the scanned content are stored as indicated by FIG. 3 (stages 313a and 313b). The scanned content is analyzed and a score is determined by the scoring module 145 and assigned to the monitored social media account (stage 315).

Figure 11:
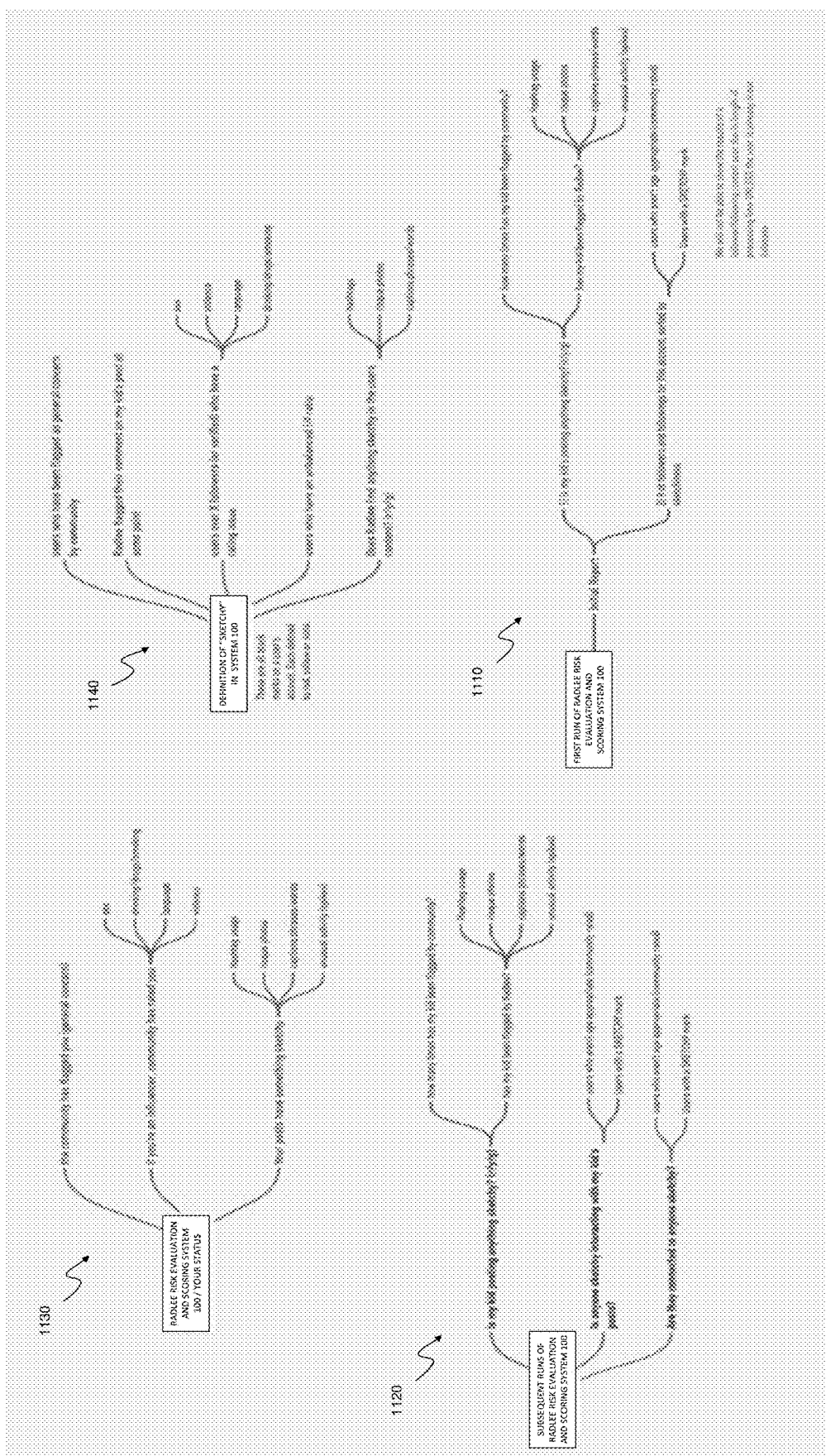
FIG. 11 illustrates an exemplary approach to evaluating and rating the scanned content as part of the process of generating a score for the monitored social media account.

FIG. 11 illustrates an exemplary approach to evaluating and rating the scanned content which may be employed by the scoring module 145 and other modules of the system 100 as part of the process of generating a score for a monitored social media account of a child and generating an associated report for a parent or guardian. As shown, during a first run of the risk evaluation and scoring system 100 an initial report may be generated and include information such as, for example, whether the monitored account has been flagged by the community, has been flagged by the system 100 (e.g., for risk-associated hashtag usage, risque photos, and use of risk-associated phrases/words) (stage 1110). The initial report may also indicate whether any accounts connected to the monitored social media account are associated with users that do not, in the judgment of the community, behave in an age appropriate manner and whether any such accounts are associated with users characterized as risky or "sketchy" (discussed below). As shown, during subsequent runs of the risk evaluation and scoring system 100, similar risk-associated information may be generated and provided, via the app 116, to the parent or guardian linked to the monitored social media account (stage 1120). Based upon the initial and subsequent runs of the risk evaluation and scoring system 100, status information may also be provided through the app 116 (stage 1130).

Finally, in one embodiment a social media account user may be deemed to be risky or "sketchy" for a number of reasons (stage 1140). For example, the social media account user may be deemed to be sketchy when flagged by the community of users of, or subscribers to, the system 100, as being associated with account content or behavior deemed suspicious or otherwise objectionable. A social media account user may be deemed to be risky or "sketchy" when the system 100 flagged a comment made by the flagged user with respect to a post in the monitored social media account, when more than a defined number of followers of the flagged user have accounts that are rated negatively in one or more respects (e.g., sex, violence, language, drinking/drugs/smoking), flagged users having an unbalanced following/follower ratio, and flagged users having accounts associated with content (e.g., hashtags, risque photos, captions/phrases/words) deemed risky in at least some respect.

Turning again to FIG. 3, in one embodiment the child's monitored social media account is scanned on a weekly basis (stage 320), as are all social media accounts connected the child's monitored social media account (e.g., social media accounts followed by the monitored social media account or following the monitored account) (stage 322). With respect to scanning of the child's account, the data collection module 134 scans the child(s) account on schedule for all account changes since last run (stage 324). Child-posted photos in the monitored social media account are scanned and scoring is applied based on results of a photo scanning algorithm (stage 326). Exemplary photo scanning algorithms and APIs are commercially available from many sources, including Microsoft, Amazon Web Services (AWS), Google, IBM, Clarifai, and others, including open-source libraries originally developed by Yahoo!. Any one or a combination of these photo scanning algorithms may be used within the present system. Alternatively, a similar photo scanning algorithm may be developed using existing machine learning techniques.

Next, hashtags present within the monitored social media account are scanned, compared to a database of known hashtags, and a resulting score provided (stage 328). Captions posted by the child within the monitored social media account are scanned, compared in a database of known words and phrases, and a resulting score provided (stage 330). Comments posted on the monitored social media account may also be scanned, compare to database of known words and phrases, and a score provided (stage 332). Current likes/photos associated with the monitored social media account may be analyzed, compared to likes/photos associated with the monitored social media account during the previous 4 periods, and a score applied (stage 334). In one embodiment an alert is generated if this comparison identifies a significant variance in the type or number of likes/photos over time. Current comments/photos associated with the monitored social media account may be analyzed, compared to comments/photos associated with the monitored social media account during the previous 4 periods, and a score applied (stage 336). In one embodiment an alert is generated if this comparison identifies a significant variance in the type or number of comments/photos over time. A list of new followers linked to the monitored social media account may also be determined, and a risk-related score may be provided for each (stage 338). A list of new followees of the monitored social media account may also be determined, and a risk-related score may be provided for each (stage 340). The change in the number of new followers of the monitored social media account for the current week may be compared to the previous 4 weeks and an alert provided through the app 116 to the extent a variance of defined significance is determined (stage 342). The change in the number of new followees of the monitored social media account for the current week may be compared to the previous 4 weeks and an alert provided through the app 116 to the extent a variance of defined significance is determined (stage 344).

With respect to scanning of the social media accounts connected to the social media account being monitored (stage 322), in one embodiment the Data collection module 134 scans the connected accounts on the defined schedule (e.g., weekly) for all changes. In one embodiment a risk-associated score is created by the scoring module 145 for each new connected account (stage 350) by combining the following scores associated with each new connected account. For example, photos posted to the new connected account are scanned and a score is determined based upon results produced by a photo scanning algorithm (stage 352). In one embodiment such a scanning algorithm is configured to assess the extent to which a scanned photo includes exposed flesh or other potentially risque content. Hashtags present within the new connected account may be scanned, compared to a database of known hashtags, and a score provided (stage 354). New follower accounts may be scanned for child's images and a binary indication (yes/no) may be provided if such images are found (stage 356). Comments within each new connected account may be scanned, compared to a database of known words and phrases, and a score provided (stage 358). Captions within each new connected account may be scanned, compared to a database of known phrases, and a score provided (stage 360). In addition, a community database may be searched for a previous account rating and a score provided (stage 362). Finally, in one embodiment the scanned content associated with each new connected account may be evaluated to determine the presence of violence, drugs/drinking, objectionable language, and the like (stage 364).

The AI engine 140, which in one embodiment is configured to implement unsupervised machine learning, may be run on multiple tagged accounts to build new training sets and provide feedback to the scoring module 145 (stage 368). Parental input, such as tagging/scoring suspect social media accounts which they deem suspicious, may also be received by the system 100 and stored (stage 372).

Figure 4:
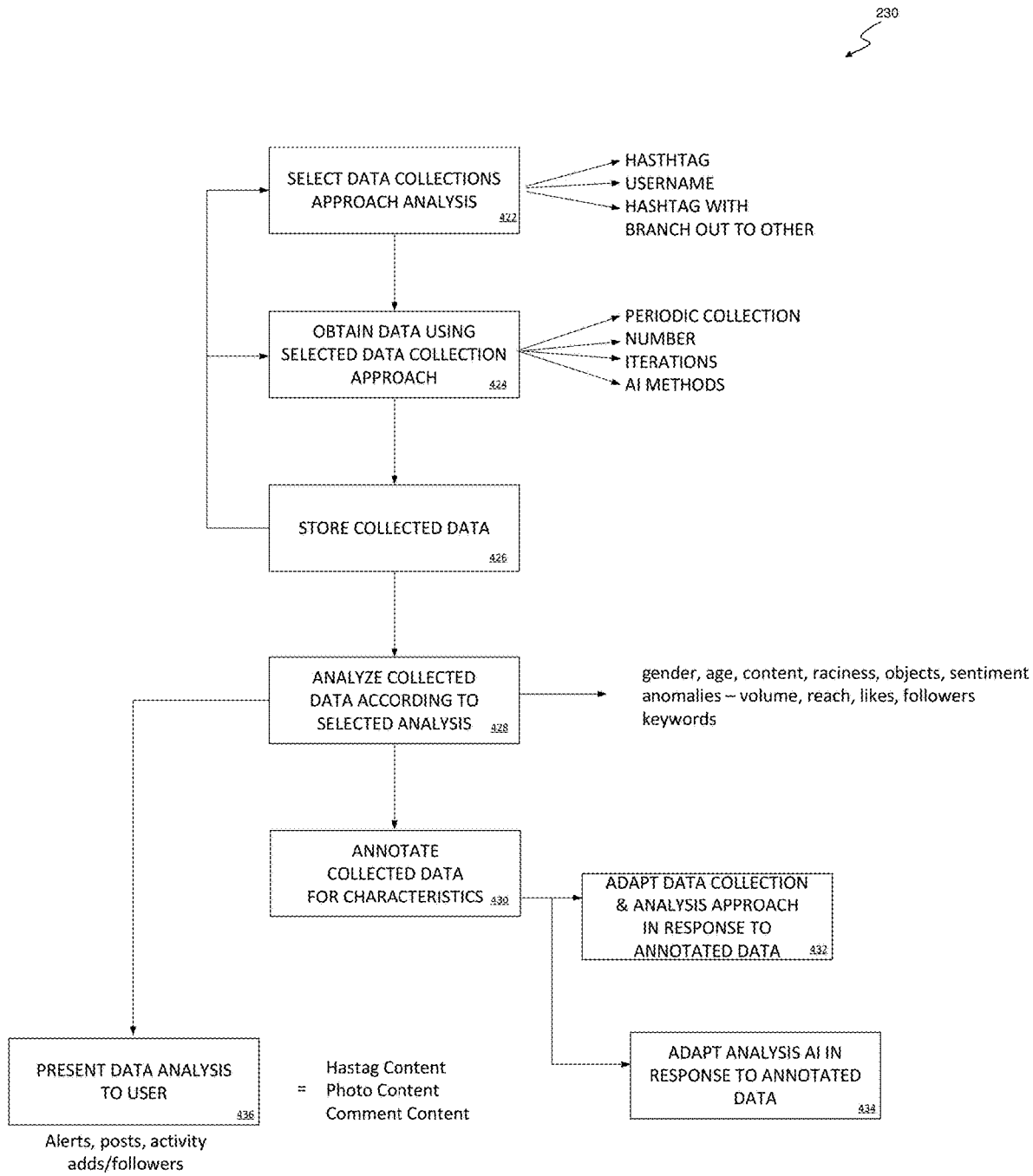
FIG. 4 provides a flowchart of an exemplary sequence of operations performed by a data collection module.
Figure 10A:
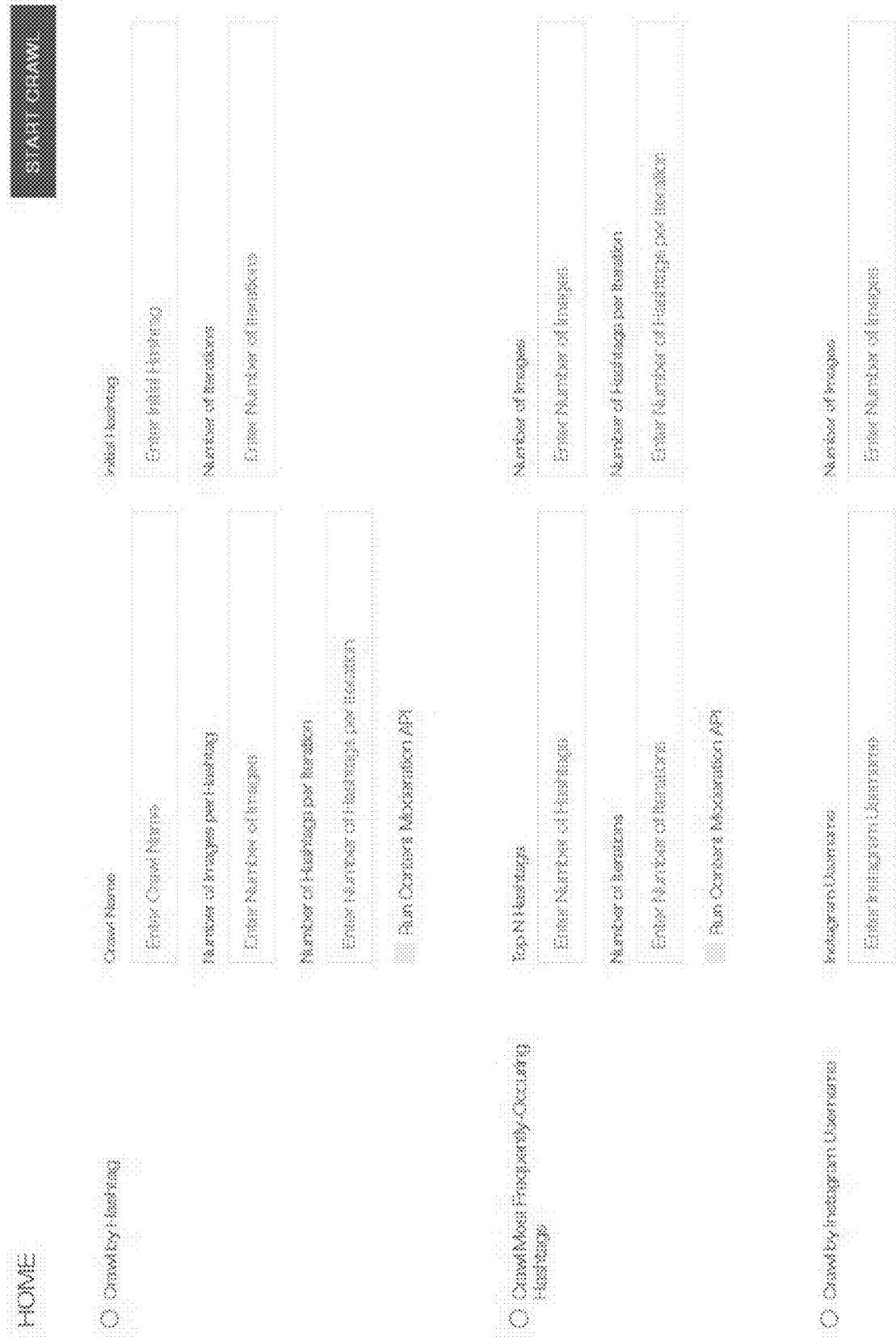
FIG. 10A is a screenshot of a crawler home screen generated by the system of FIG. 1 through which the crawling operations performed by a data collection module may be configured.
Figure 10B:
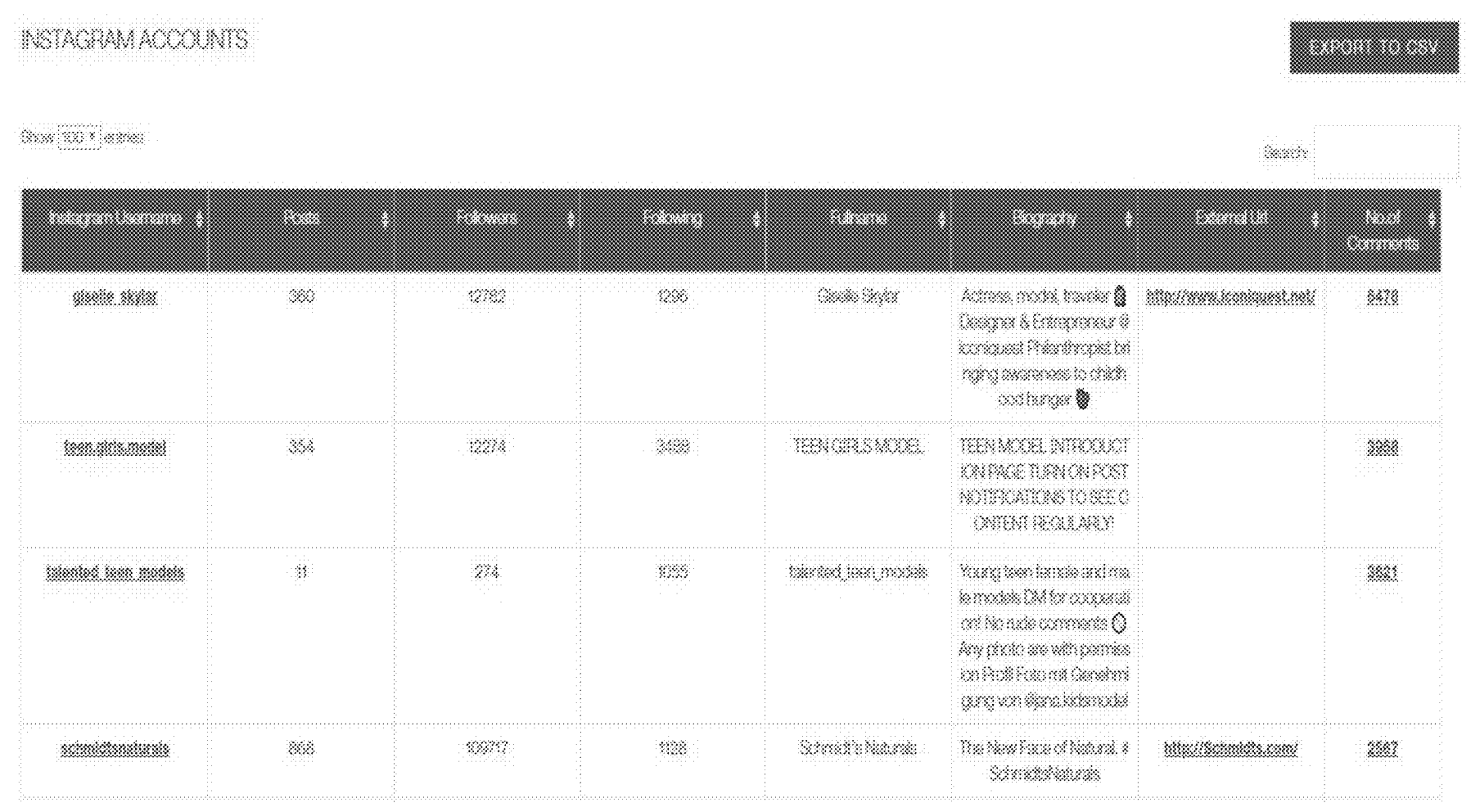
Figure 10C:
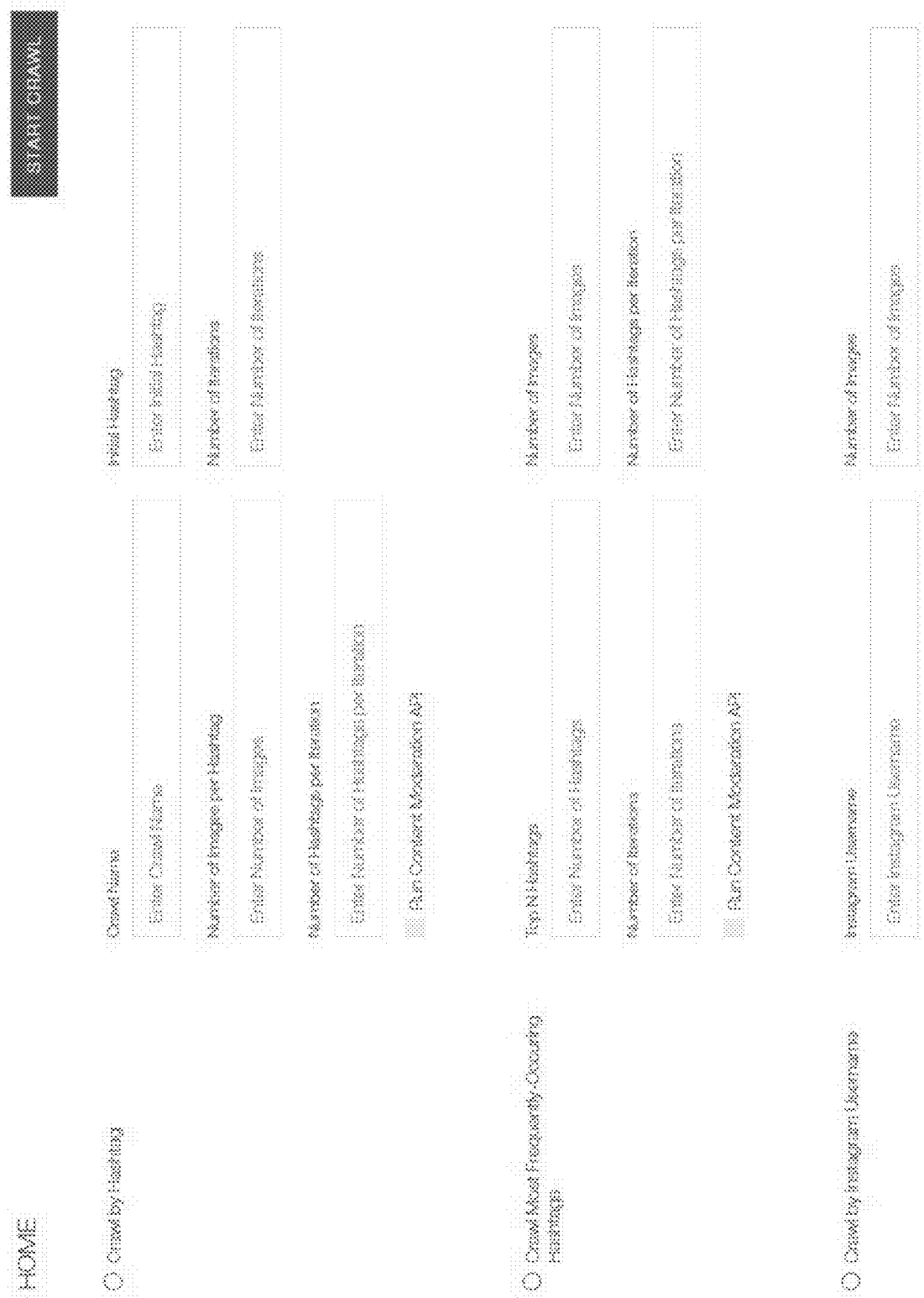
Figure 10D:
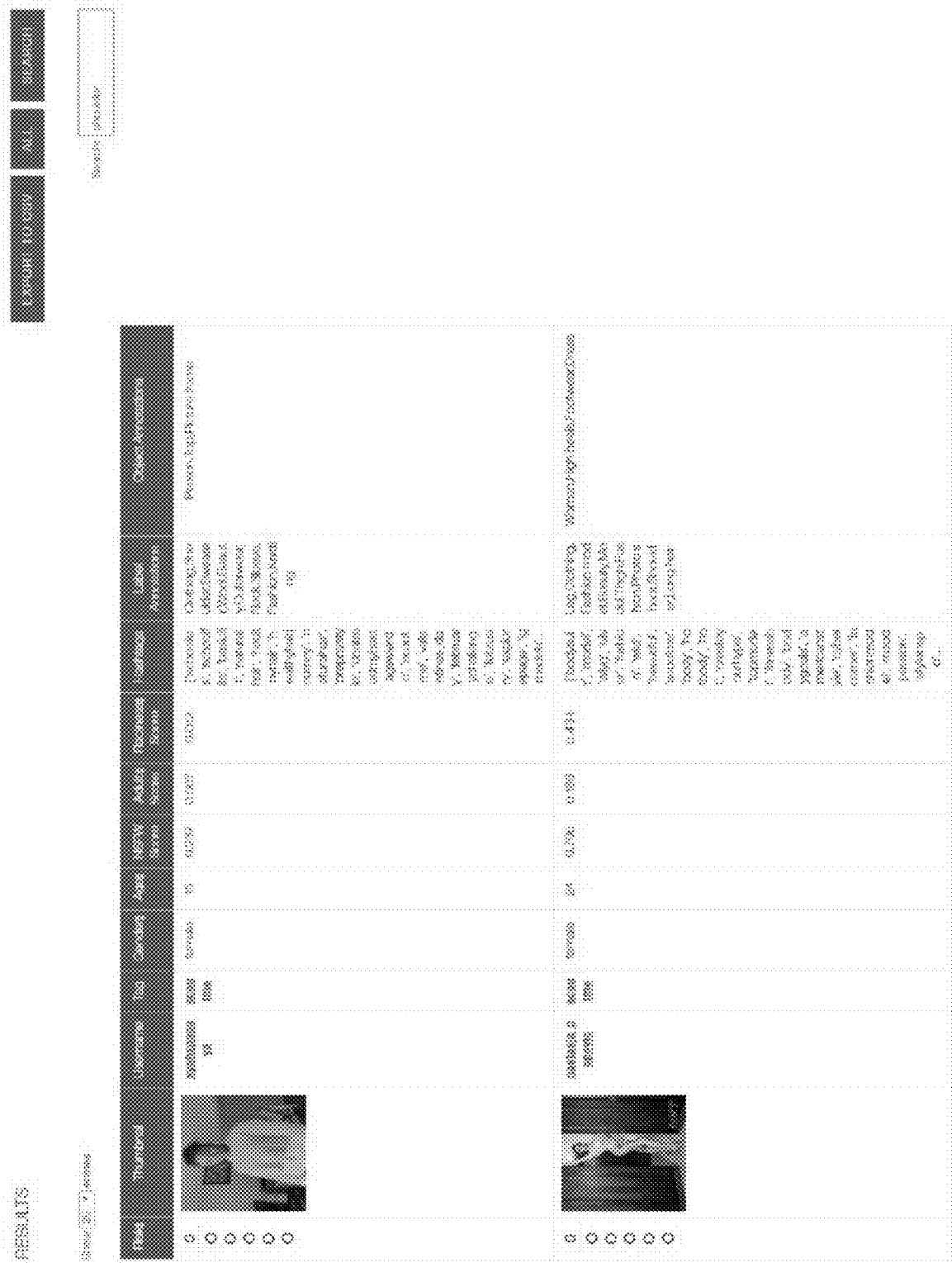
FIGS. 10D and 10E are screenshots of user interfaces generated by the system of FIG. 1 which illustrate crawler results and crawler comments, respectively.
Figure 10E:
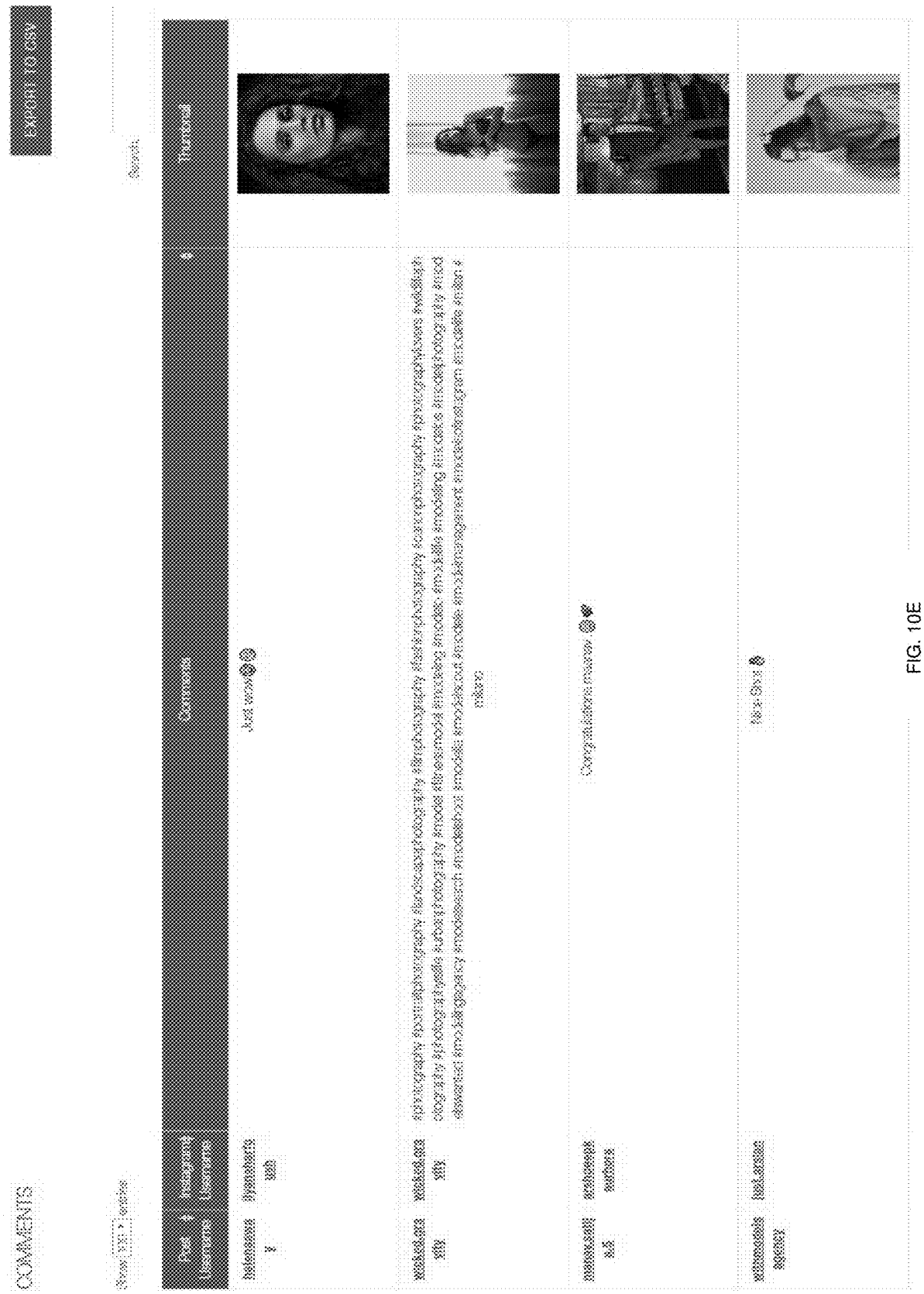

Attention is now directed to FIG. 4, which provides a flowchart of an exemplary sequence of operations performed by the data collection module 134 during stage 230 (FIG. 2). As shown, actual collection of data from monitored social media accounts is preceded by a selection of a strategy or particular approach of searching through a social media account being monitored (stage 422). For example, certain social media platforms 120 may not be amenable to "brute force" searching techniques, either because of their data organization or because of the substantial amounts of computing power that could be required to directly and comprehensively search the content of accounts hosted by such platforms. Instead, the accounts of certain platforms 120 may preferably be searched using techniques which reduce the relevant search space. For example, one way to reduce the relevant search space is to start with a user name, and then branch out into their followers. As another example, searching could begin by first identifying users having accounts mentioning a hashtag of interest and then branching out to crawl other users following and/or followed by such users. From this set of users, further searching could occur by branching out from this set of users and finding other linked users having account content mentioning one or more other hashtags. The data collection module 134 may, for example, be configured to periodically crawl social media accounts by either hashtag or username. The initial search strategy selected in particular embodiments will generally depend upon the objectives of the social media account monitoring being performed by the system 100. FIG. 10A is a screenshot of a crawler home screen generated by the system 100 through which the crawling operations performed by the data collection module 134 may be configured. FIGS. 10B and 10C are screenshots illustrating crawler accounts and crawler processes, respectively. FIGS. 10D and 10E are screenshots illustrating crawler results and crawler comments, respectively.

Once a search strategy has been selected, social media account data is collected by the data collection module 134 by crawling accounts using the selected search strategy (stage 424). The collected data is then stored within memory 128 (stage 426). The data collection may occur periodically, over a number of iterations (e.g., up to the top 100 followers of each monitored account), or some other strategy. Next, the collected data is analyzed according to a selected analysis strategy (stage 428). This analysis may include, for example, reviewing and classifying the collected data based upon, for example, gender, age, raciness, content type, volume of posts (e.g., relative to historical averages or prior data collection periods), sentiment and/or keywords (e.g., words or phrases such as, for example, "sugar daddy" or "DM me", indicating a sexual or inappropriate relationship). In the case of photos, for example, the AI engine 140 may execute algorithms providing an indication of objects, persons or other content within the photos. For example, the AI engine 140 may execute routines to determine if persons in a photo are male or female, their approximate age, sentiment, and whether the photo includes particular types of objects or includes any anomalies. In some embodiments the detection of certain keywords may immediately lead to generation of alerts to a user of the app 116, while detection of other keywords or events will influence risk scoring by the scoring module 145 of social media accounts linked in some to the social media account being monitored.

The collected data may be annotated by the AI engine 140 for various characteristics (stage 430). The analysis performed by the AI engine 140 may also be adapted in response to training based upon annotated data (stage 434). For example, in applications of the system 100 in the human trafficking space, the AI engine 140 could be specifically trained by, for example, providing parents or other users of the app 116 with the ability to tag content items (e.g., hashtags, photos, comments) in their children's social media account(s) that they deem suspect. This training may be used not only to adapt the analysis performed by the AI engine 140 but also to adapt the data collection approach utilized (stage 432). Upon being analyzed by the AI engine 140 and the anomaly detection module 136, data analysis information and optionally rating or scoring information relating to the collected data may be presented to a user of the app 116 (stage 436). For example, data analysis information relating to, for example, hashtag content, photo content and comment content may be provided. In addition, alerts and information relating to posts (e.g., volume, etc.) and followers (e.g., new followers) may also be provided.

Figure 5:
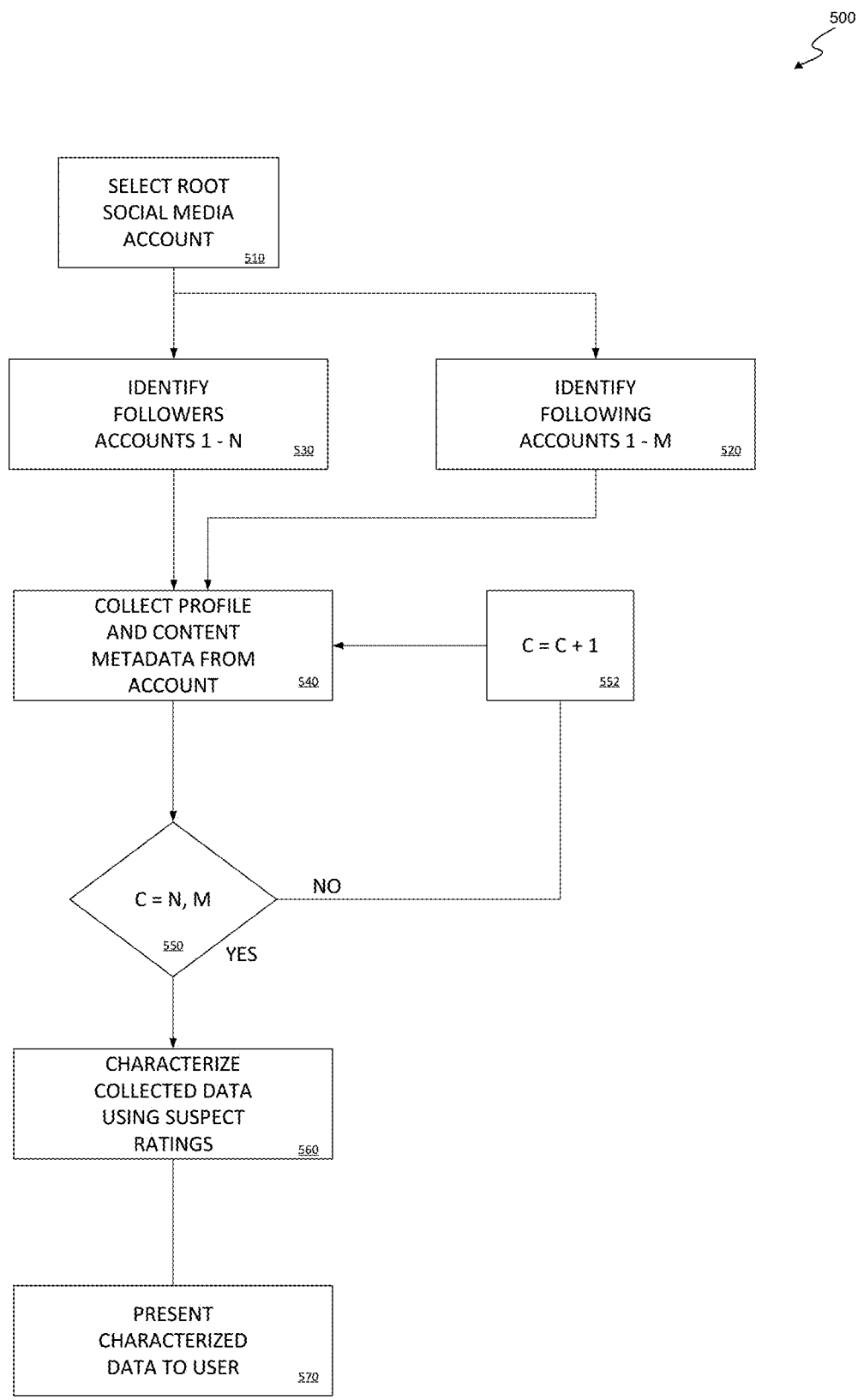
FIG. 5 is a flowchart illustrating a particular manner in which the data collection and analysis operations described with reference to FIG. 4 may be implemented.

FIG. 5 is a flowchart illustrating a particular manner in which various data collection and analysis operations 500 described with reference to FIG. 4 may be implemented. As shown, the operations may include selecting a root social media account (stage 510), i.e., the social media account being monitored. The N accounts following the root account and the M accounts being followed by the root account are then identified (stages 520 and 530). Profile and content metadata are then collected from these accounts (stage 540). Once such metadata has been collected from all of the accounts (stages 550 and 552), the collected data is characterized using suspect ratings (stage 560) and the characterized data is presented to the user of the app 116 (stage 570).

Figure 6:
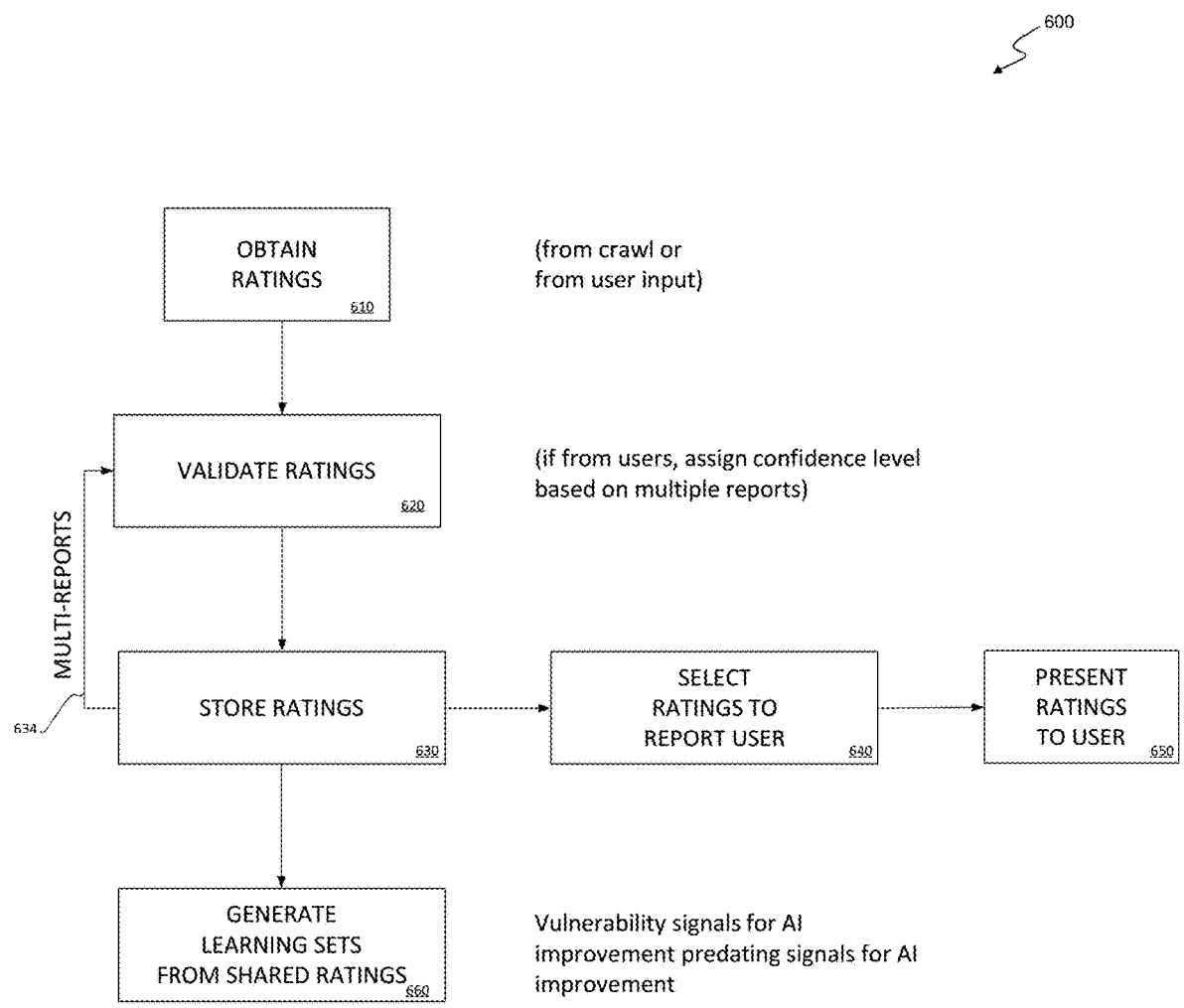
FIG. 6 is a flowchart illustrating a process for validating externally-provided ratings of content on social media accounts being monitored.

FIG. 6 is a flowchart illustrating a process 600 for validating externally-provided ratings of content on social media accounts being monitored. Content collected from social media accounts being monitored by the system 100 and/or from linked accounts may be rated by, for example, using an automated crawling process accessible through APIs (stage 610). Alternatively, such content may be manually rated by parents reviewing the content of the social media accounts being monitored by the system. However, in one embodiment a validation process is performed in order to validate or otherwise assign a confidence level to such manual content ratings (stage 620). Pursuant to this process reports or ratings of account content are received from multiple users. In one embodiment multiple such reports are used (stage 634) in a validation operation to determine a confidence level. For example, one report identifying content as suspicious might result in a 50% confidence level, while two reports yield a 75% confidence level and three reports translates into a 90% confidence level. The reports and associated confidence levels are stored upon validation (stage 630) and one or more such reports may then be selected for reporting to a user (stage 640). For example, in one embodiment only reports associated with a confidence level greater than a defined threshold may be selected for reporting. Content ratings generated based upon the reports, or simply aspects of the reports themselves, may then be presented to a user via the app 116 (stage 650).

Figure 8:
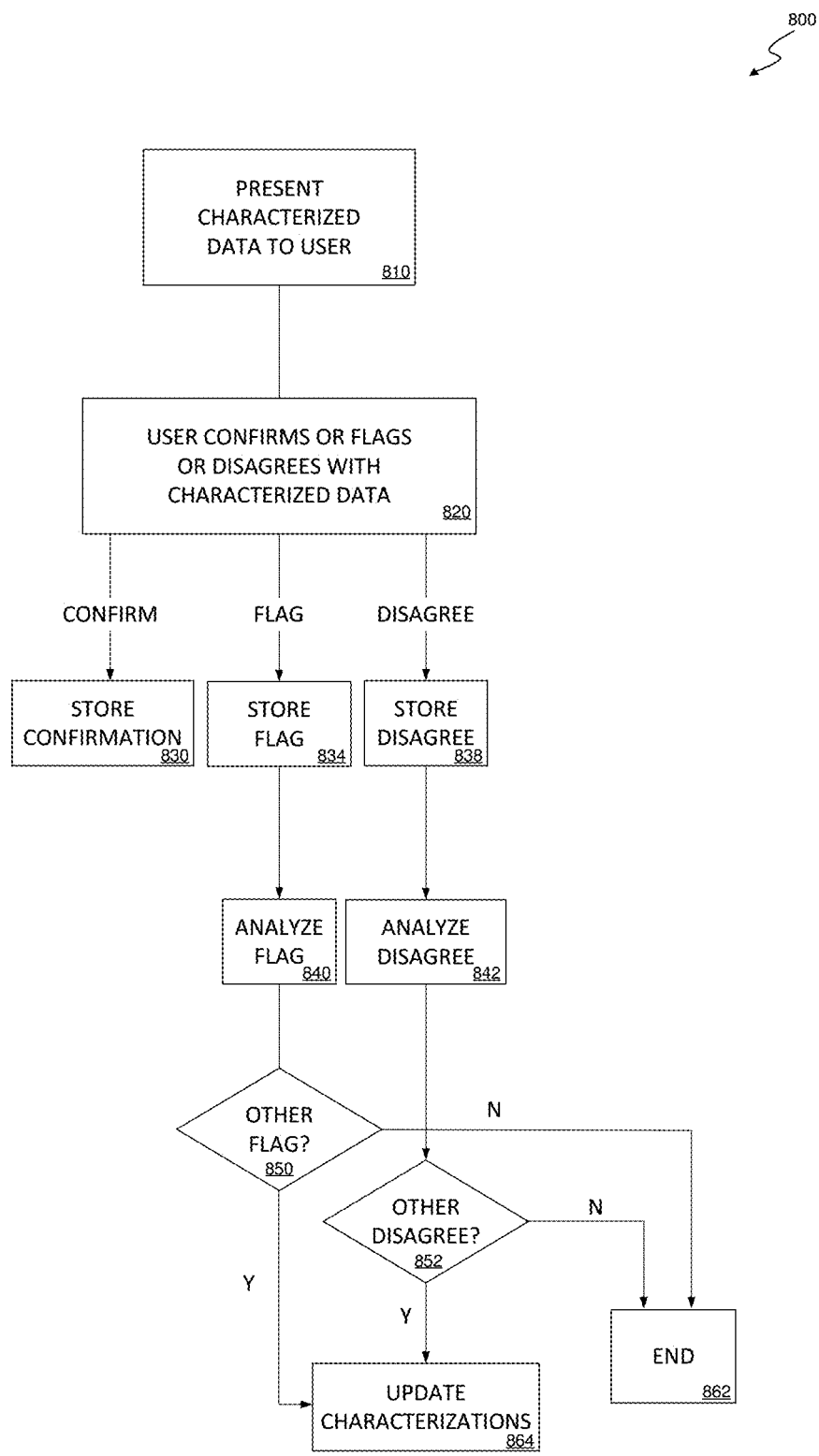
FIG. 8 is a flowchart illustrating an exemplary sequence of operations performed by an algorithm update module.
Figure 9A:
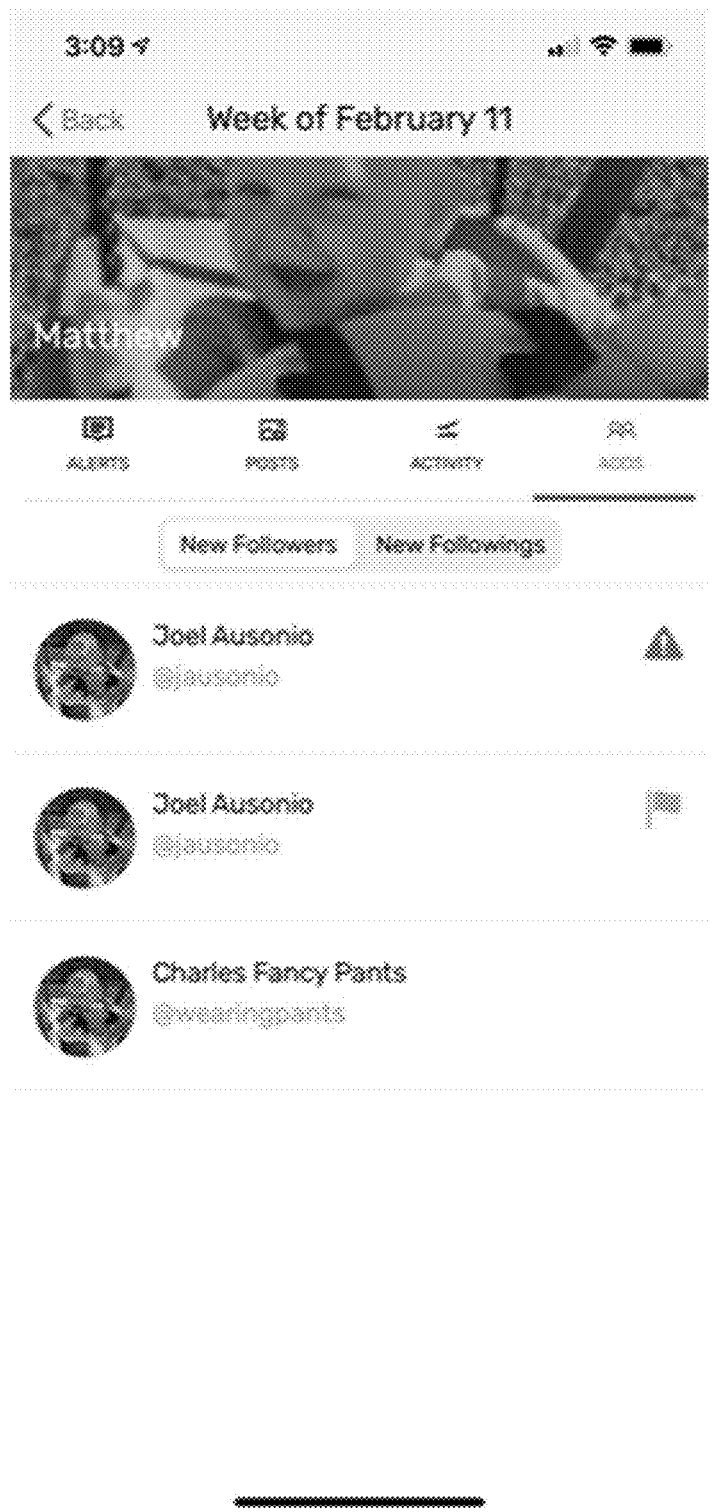
FIGS. 9A to 9F are screenshots of user interfaces generated by a user application which identify certain types of content present in a monitored social media account.
Figure 9B:
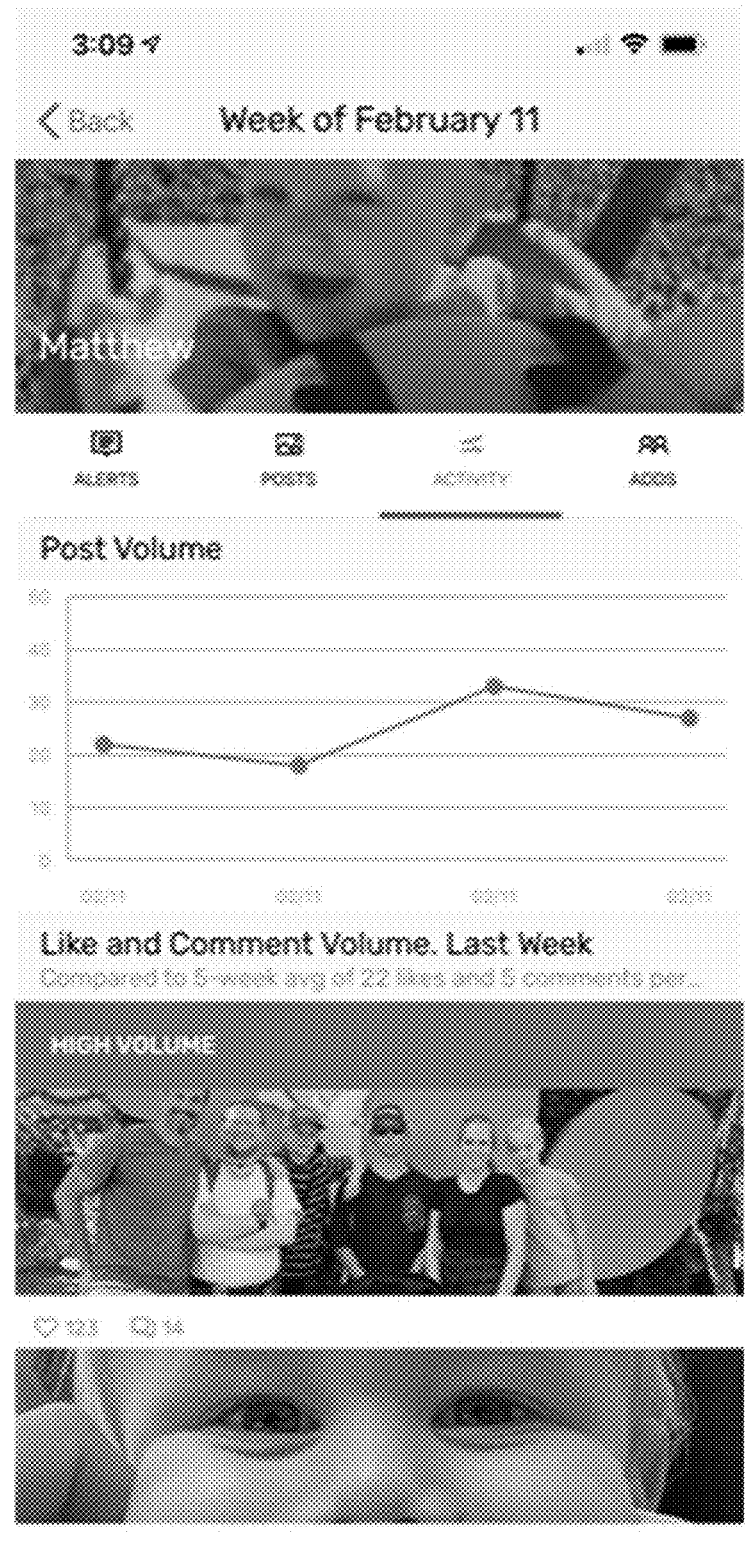
Figure 9C:
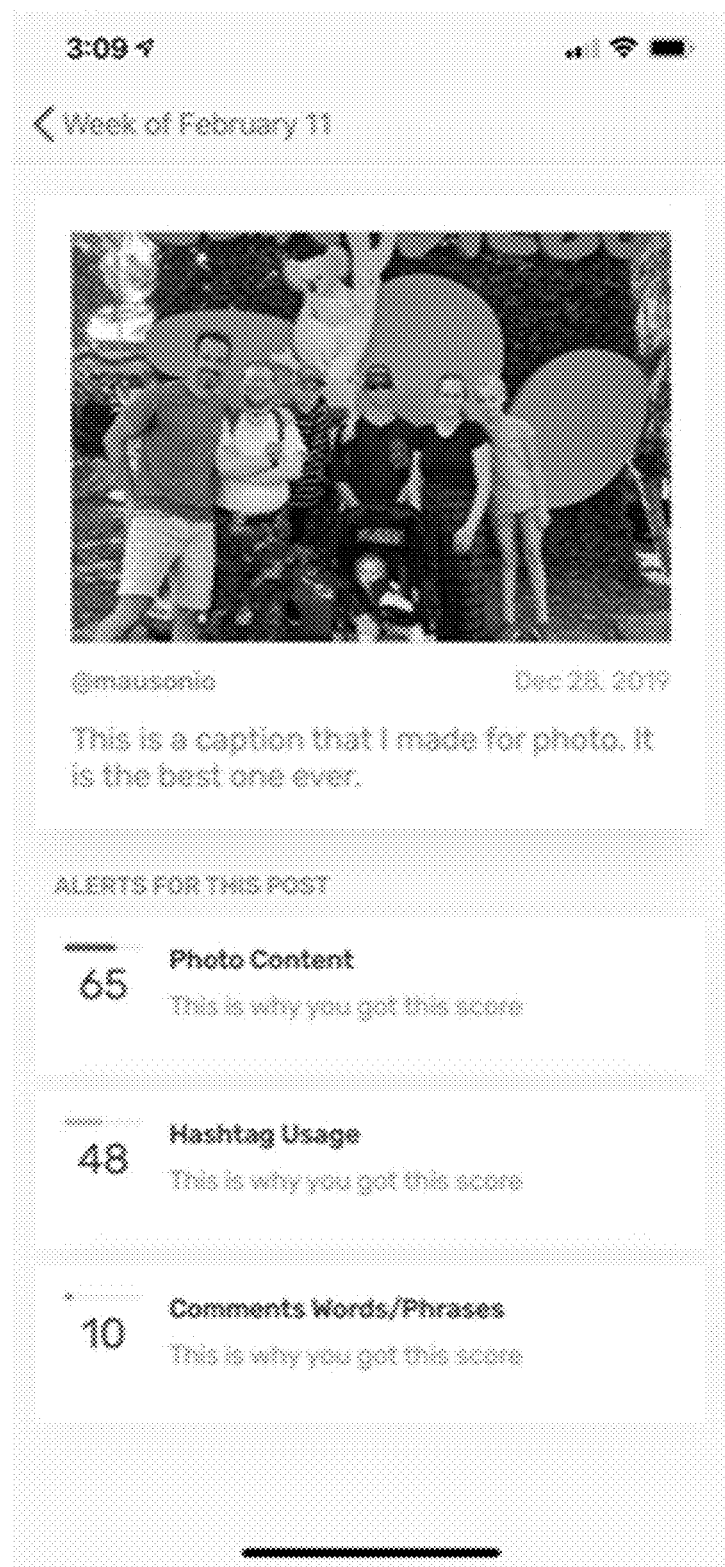
Figure 9D:
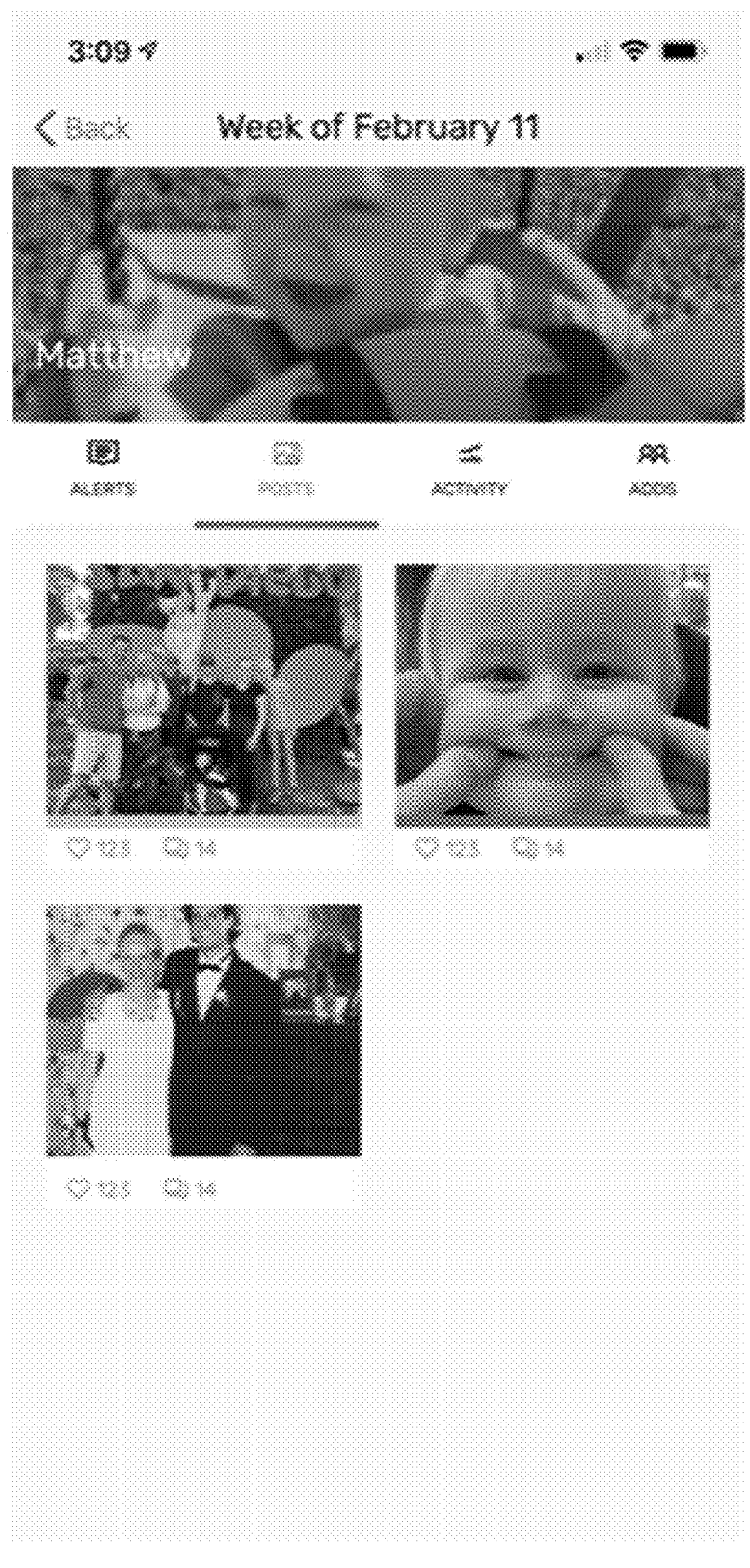
Figure 9E:
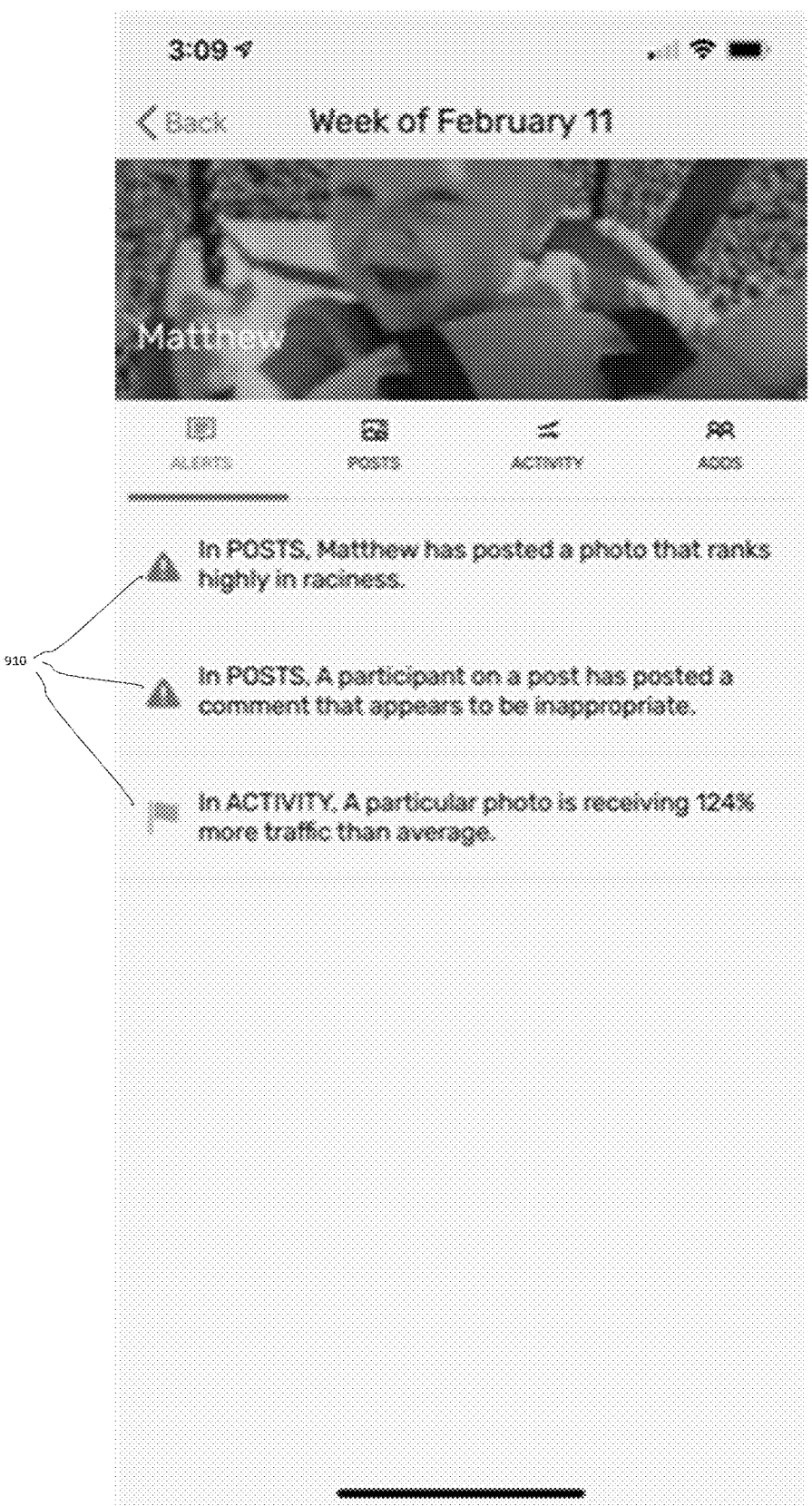
Figure 9F:
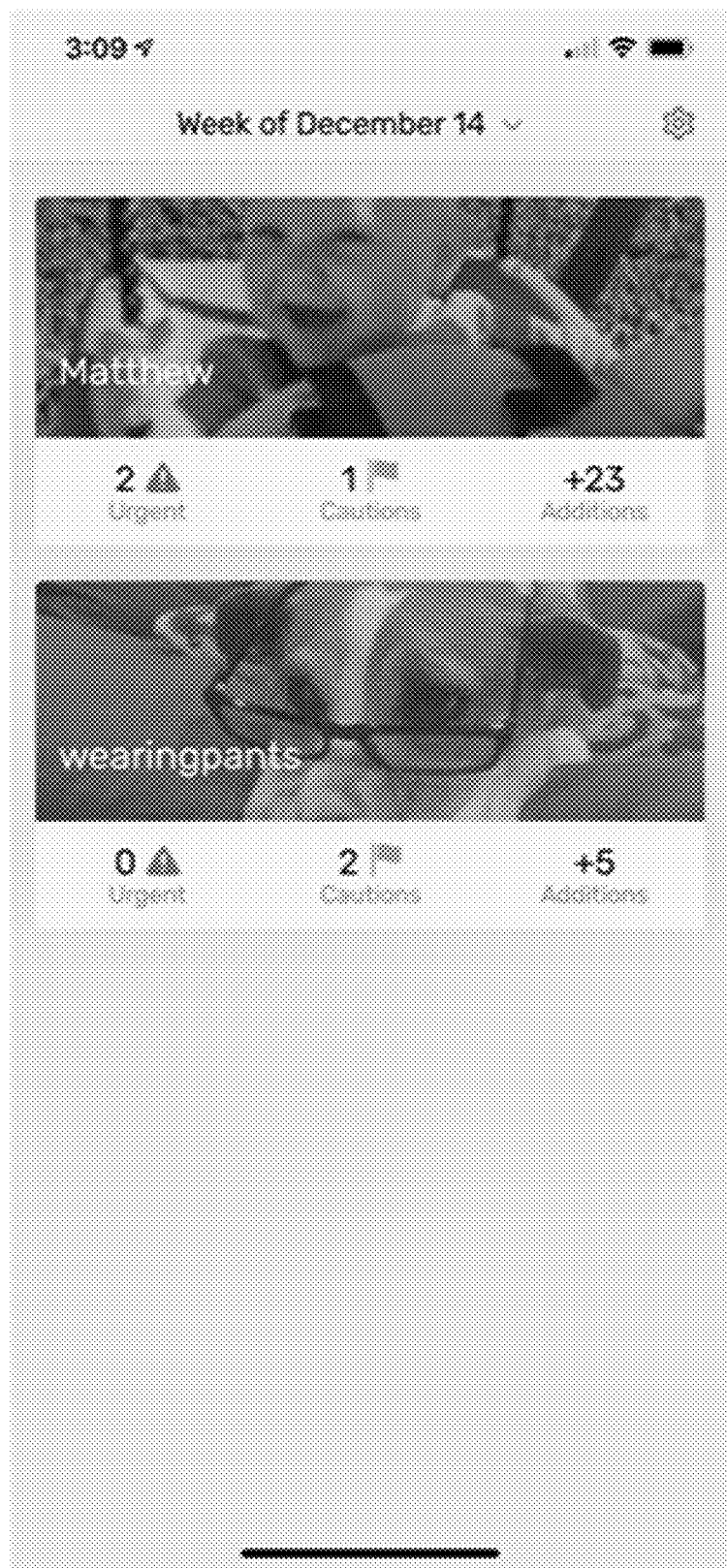

Attention is now directed to FIG. 8, which is a flowchart illustrating an exemplary sequence of operations 800 performed by the algorithm update module 144. In general, the algorithm update module 144 utilizes input from parents or other users of the app 116 in order to improve the accuracy with which data collected by the data collection module 134 from monitored social media accounts is characterized. As shown, these operations include presenting previously characterized data to a user of the app 116, such as a parent (stage 810). In each instance the user either confirms the accuracy of the data characterization or disagrees with or otherwise flags the characterization (stage 820). The user's response (i.e., confirm, flag, disagree) is then stored (stages 830, 834, 838). With regard to analysis of user flags and disagreements (stages 840, 842), it is initially determined whether any other users have flagged or disagreed with the previous characterization of the particular data item (stages 850, 852). If not, the previous characterization of the data item is not updated (stage 862); otherwise, the previous characterization of the data item is updated based upon analysis of the flag and/or disagreement, as applicable (stage 864).

Figure 13:
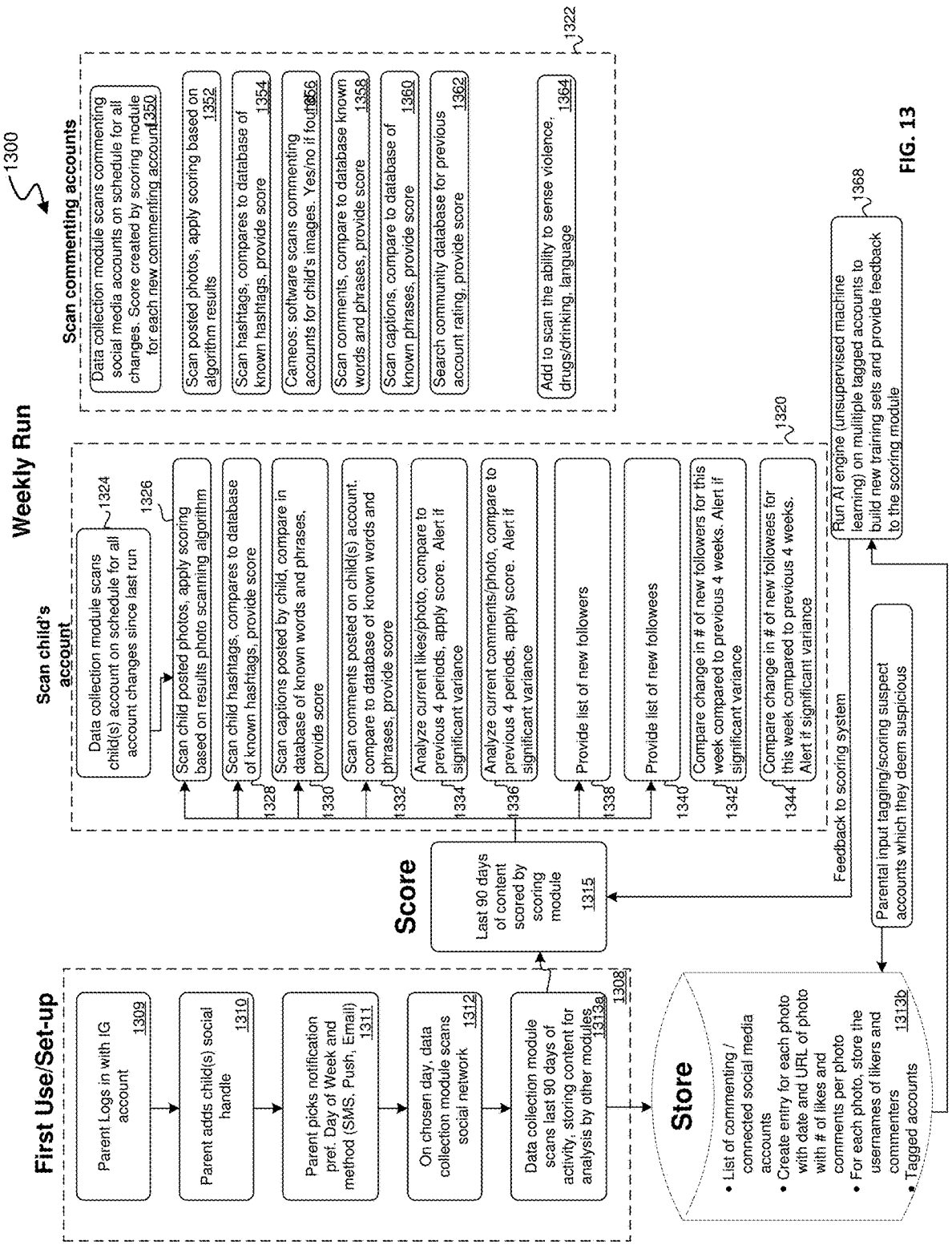
FIG. 13 is a more detailed flowchart of various front end and backend processes performed by the system of FIG. 1 in connection with an alternate mode of monitoring and evaluating of social media accounts.

Turning now to FIG. 13, a flowchart is provided of various front end and backend processes 1300 performed by the system 100 in connection with an alternate mode of monitoring and evaluating of social media accounts. As may be appreciated by comparing FIGS. 3 and 13, the front end and backend processes 300 and 1300 performed by the system 100 in connection with these alternate modes of monitoring and evaluating social media accounts are substantially similar. The processes 300 and 1300 differ in that in the alternate mode of account monitoring represented by FIG. 13, connected accounts (i.e., social media accounts following, and followed by, the social media account being monitored) are not themselves scanned nor their content evaluated. Rather, pursuant to the process 1300 only the monitored social media account and the social media accounts of individuals commenting on the posts or other aspects of the monitored social media account are scanned and their content evaluated as illustrated in FIG. 13 (stage 1322). In the embodiment of FIG. 13, a list is made of the accounts connected to the monitored social media account and changes to this list are evaluated (stages 1338, 1340, 1342, 1344), but the content of the connected accounts is not scanned nor utilized in connection with generating alerts or reports.

The disclosure discussed herein provides and describes examples of some embodiments of the system for risk evaluation and reputational scoring of social media accounts. The designs, figures, and descriptions are non-limiting examples of selected embodiments of the disclosure. For example, other embodiments of the disclosed device may or may not include the features described herein. Moreover, disclosed advantages and benefits may apply to only certain embodiments of the disclosure and should not be used to limit the various disclosures.

As used herein, coupled means directly or indirectly connected by a suitable means known to persons of ordinary skill in the art. Coupled items may include interposed features such as, for example, A is coupled to C via B. Unless otherwise stated, the type of coupling, whether it be mechanical, electrical, fluid, optical, radiation, or other is indicated by the context in which the term is used.

As used in this specification, a module can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

As used in this specification, the singular forms "a," "an" and "the" include plural referents unless the context clearly dictates otherwise. Thus, for example, the term "an actuator" is intended to mean a single actuator or a combination of actuators.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described embodiments.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media in which the KCM may reside include, without limitation, one time programmable (OTP) memory, protected Random-Access Memory (RAM) and flash memory.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:
1. A system, comprising:
a memory;
one or more processors operatively connected to the memory and configured to:
scan account content associated with a social media account wherein the account content includes at least one image and image caption posted to the social media account and one or more comments posted to the social media account by one or more commenting users associated with one or more commenting social media accounts;
scan commenting account content associated with at least some of the one or more commenting social media accounts, the commenting account content including at least one of profile metadata and content metadata;

store, within the memory, collected data relating to the account content and the commenting account content;

analyze the collected data relating to the account content by determining at least one of: one of more characteristics of the image, and at least one parameter of the one or more comments or of the at least one image caption;

analyze the collected data relating to the commenting social media account content and characterize one or more of the commenting social media accounts with a level of suspicion; and generate a risk assessment report identifying risk information relating to risk-related characteristics of the social media account, the risk information including one or more of:

content characterization information identifying at least some of the account content as presenting a risk based upon at least one of: the one of more characteristics of the image and the at least one parameter of the one or more comments or of the at least one image caption, traffic change information identifying changes in user traffic associated with the social media account greater than a defined threshold within a defined time period, and suspicious account information identifying one or more of the commenting social media accounts as being associated with suspicious activity.

2. The system of claim 1 wherein the traffic change information relates to changes in volume of one of likes and comments made by other users of other social media accounts with respect to the social media account.

3. The system of claim 1 wherein the traffic change information relates to changes in a number of views of the image by other users of other social media accounts.

4. The system of claim 1 wherein the image is a photograph and wherein the one or more processors are further configured to store, within the memory in association with the social media account, a link to the photograph, at least one of a number of likes and a number of comments associated with the photograph on a first calendar date, and a list of other social media accounts associated with the likes and comments.

5. The system of claim 4 wherein the one or more processors are further configured to store, within the memory in association with the social media account, a list of the commenting social media accounts.

6. The system of claim 1 wherein the account content includes one or more hashtags posted to the social media account and wherein the one or more processors are further configured to compare the one or more hashtags to a set of known hashtags included within a database and to determine whether to identify the one or more hashtags in the risk assessment report based upon the comparison.

7. The system of claim 1 wherein the one or more processors are further configured to scan connected account content by:

selecting the social media account,
identifying N follower social media accounts following the social media account,
identifying M following social media accounts followed by the social media account,
collecting first profile metadata and first content metadata from each of the N follower social media accounts,
collecting second profile metadata and second content metadata from each of the M following social media accounts.

8. The system of claim 7 wherein the one or more processors are further configured to:

characterize, based upon the first profile metadata and the first content metadata, each of the N follower social media accounts using first suspect ratings,
wherein the risk assessment report is generated at least in part based upon the first suspect ratings.

9. The system of claim 8 wherein the one or more processors are further configured to:

characterize, based upon the second profile metadata and the second content metadata, each of the M following social media accounts using second suspect ratings,
wherein the risk assessment report is generated at least in part based upon the second suspect ratings.

10. A system, comprising:

a memory;
one or more processors operatively connected to the memory and configured to:

scan account content associated with a social media account wherein the account content includes a plurality of posts, the plurality of posts including at least one image posted to the social media account by a user of the social media account and at least one comment or image caption posted to the social media account by the user, the account content further including a list of connected social media accounts having a connection to the social media account wherein the list of connected social media accounts includes at least one of a list of social media accounts following the social media account and a list of social media accounts followed by the user of the social media account;

store, within the memory, collected data relating to the account content;

analyze the collected data relating to the account content by determining at least one of: one or more characteristics of the image, one or more parameters of the at least one comment or image caption, and changes in the list of connected social media accounts;

generate a risk assessment report including risk information, the risk information including one or more of:

post characterization information identifying at least one of the plurality of posts as including textual or image content of defined types, traffic change information identifying changes in user traffic associated with the social media account greater than a first defined threshold within a first defined time period, and new connected account information identifying increases in a number of the connected social media accounts exceeding a second defined threshold within a second defined time period.

11. A system, comprising:

a memory;
one or more processors operatively connected to the memory and configured to:

scan account content associated with a social media account wherein the account content includes at least one image posted to the social media account by a user of the social media account and at least one comment or image caption posted to the social media account by the user, the account content further including a list of connected social media accounts having a connection to the social media account wherein the list of connected social media accounts includes at least one of a list of social media accounts following the social media account and a list of social media accounts followed by the user of the social media account;

determine a first number of the connected social media accounts existing at a first time and a second number of the connected social media accounts existing at a second time;

store, within the memory, collected data relating to the account content and the first number and the second number of connected social media accounts;

analyze the collected data relating to the account content by determining at least one of: one of more characteristics of the image and a difference between the second number of connected social media accounts and the first number of connected social media accounts; and generate a risk assessment report identifying risk information relating to risk-related characteristics of the social media account, the risk information including content characterization information identifying at least some of the account content as presenting a risk based upon at least one of:

the one of more characteristics of the image; and a value of the difference greater than a defined threshold.

12. A computer-implemented method of evaluating risk associated with a social media account, the method comprising:

automatically scanning account content associated with a social media account wherein the account content includes at least one image posted to the social media account by a user of the social media account and at least one comment or image caption posted to the social media account by the user, the account content further including a list of connected social media accounts having a connection to the social media account wherein the list of connected social media accounts includes at least one of a list of social media accounts following the social media account and a list of social media accounts followed by the user of the social media account;

automatically scanning connected account content associated with at least some of the connected social media accounts, the connected account content including at least one of profile metadata and content metadata;

storing, within a memory, collected data relating to the account content and the connected account content;

analyzing the collected data relating to the account content by determining at least one of:

one of more characteristics of the image, one or more parameters of the at least one comment or image caption, and changes in the list of connected social media accounts, analyzing the collected data relating to the connected account content and characterizing one or more of the connected social media accounts with a level of suspicion; and generating a risk assessment report identifying risk information relating to risk-related characteristics of the social media account, the risk information including one or more of:

content characterization information identifying at least some of the account content as presenting a risk based upon at least one of: the one of more characteristics of the image and the one or more parameters of the at least one comment or image caption, traffic change information identifying changes in user traffic associated with the social media account greater than a defined threshold within a defined time period, and suspicious account information identifying one or more of the connected social media accounts as being associated with suspicious activity.

13. The method of claim 12 wherein the traffic change information relates to changes in volume of one of likes and comments made by other users of other social media accounts with respect to the social media account.

14. The method of claim 12 wherein the traffic change information relates to changes in a number of views of the image by users of other social media accounts.

15. The method of claim 12 wherein the image is a photograph and wherein the one or more processors are further configured to store, within the memory in association with the social media account, a link to the photograph, at least one of a number of likes and a number of comments associated with the photograph on a first calendar date, and a list of other social media accounts associated with the likes and comments.

16. The method of claim 15 wherein the one or more processors are further configured to store, within the memory in association with the social media account, a list of the connected social media accounts.

17. The method of claim 12 wherein the account content includes one or hashtags posted to the social media account and wherein the one or more processors are further configured to compare the one or more hashtags to a set of known hashtags included within a database and to determine whether to identify the one or more hashtags in the risk assessment report based upon the comparison.

18. The method of claim 12 wherein the one or more processors are further configured to scan the connected account content by:

selecting the social media account, identifying N follower social media accounts following the social media account, identifying M following social media accounts followed by the social media account, collecting first profile metadata and first content metadata from each of the N follower social media accounts, collecting second profile metadata and second content metadata from each of the M following social media accounts.

19. The method of claim 18 wherein the one or more processors are further configured to:

characterize, based upon the first profile metadata and the first content metadata, each of the N follower social media accounts using first suspect ratings, wherein the risk assessment report is generated at least in part based upon the first suspect ratings.

20. The method of claim 19 wherein the one or more processors are further configured to:

characterize, based upon the second profile metadata and the second content metadata, each of the M following social media accounts using second suspect ratings, wherein the risk assessment report is generated at least in part based upon the second suspect ratings.

21. A system, comprising:

a memory;

one or more processors operatively connected to the memory and configured to:

scan account content associated with a social media account wherein the account content includes at least one image posted to the social media account by a user of the social media account and at least one comment or image caption posted to the social media account by the user, the account content further including a list of connected social media accounts having a connection to the social media account wherein the list of connected social media accounts includes at least one of a list of social media accounts following the social media account and a list of social media accounts followed by the user of the social media account;

scan connected account content associated with at least some of the connected social media accounts, the connected account content including at least one of profile metadata and content metadata;

store, within the memory, collected data relating to the account content and the connected account content;

analyze the collected data relating to the account content by determining at least one of: one of more characteristics of the image, one or more parameters of the at least one comment or image caption, and changes in the list of connected social media accounts;

analyze the collected data relating to the connected account content and characterize one or more of the connected social media accounts with a level of suspicion; and generate a risk assessment report identifying risk information relating to risk-related characteristics of the social media account, the risk information including one or more of:

content characterization information identifying at least some of the account content as presenting a risk based upon at least one of: the one of more characteristics of the image and the one or more parameters of the at least one comment or image caption, traffic change information identifying changes in user traffic associated with the social media account greater than a defined threshold within a defined time period, and suspicious account information identifying one or more of the connected social media accounts as being associated with suspicious activity.

22. A computer-implemented method of evaluating risk associated with a social media account, the method comprising:

automatically scanning account content associated with a social media account wherein the account content includes at least one image and image caption posted to the social media account and one or more comments posted to the social media account by one or more commenting users associated with one or more commenting social media accounts;

automatically scanning commenting account content associated with at least some of the one or more commenting social media accounts, the commenting account content including at least one of profile metadata and content metadata;

storing, within a memory, collected data relating to the account content and the commenting account content;

analyzing the collected data relating to the account content by determining at least one of: one of more characteristics of the image, at least one parameter of the one or more comments or of the at least one image caption;

analyzing the collected data relating to the commenting social media account content and characterize one or more of the commenting social media accounts with a level of suspicion; and generating a risk assessment report identifying risk information relating to risk-related characteristics of the social media account, the risk information including one or more of:

content characterization information identifying at least some of the account content as presenting a risk based upon at least one of: the one of more characteristics of the image and the at least one parameter of the one or more comments or of the at least one image caption, traffic change information identifying changes in user traffic associated with the social media account greater than a defined threshold within a defined time period, and suspicious account information identifying one or more of the commenting social media accounts as being associated with suspicious activity.

23. The system of claim 1 wherein the commenting social media accounts include one or more social media accounts following the social media account.

\* \* \* \* \*